(12) United States Patent
Griffith

(10) Patent No.: US 8,322,277 B2
(45) Date of Patent: Dec. 4, 2012

(54) DEVICES AND SYSTEMS FOR COMPRESSING FOOD ARTICLES

(75) Inventor: Jonah S. Griffith, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 363 days.

(21) Appl. No.: 12/722,447

(22) Filed: Mar. 11, 2010

(65) Prior Publication Data

US 2010/0229736 A1        Sep. 16, 2010

Related U.S. Application Data

(60) Provisional application No. 61/159,344, filed on Mar. 11, 2009.

(51) Int. Cl.
*B30B 9/06* (2006.01)
*A47J 19/04* (2006.01)

(52) U.S. Cl. ....... 100/234; 100/98 R; 100/110; 100/213; 99/495; 99/508; D7/666

(58) Field of Classification Search .......... 100/110, 100/116, 125, 126, 127, 213, 233, 234, 243, 100/98 R; 99/495, 506–508; D7/665, 666; 241/169.1, 169.2

See application file for complete search history.

(56) References Cited

U.S. PATENT DOCUMENTS

| | | | | |
|---|---|---|---|---|
| 769,785 A * | 9/1904 | Bruen | | 100/226 |
| 2,131,440 A * | 9/1938 | Johnson | | 100/125 |
| 2,584,333 A | 2/1952 | Crot | | 100/45 |
| 5,165,335 A * | 11/1992 | Bianchi | | 100/112 |
| 5,305,527 A | 4/1994 | Holcomb | | |
| D349,012 S | 7/1994 | Holcomb | | |
| 6,243,952 B1 | 6/2001 | Holcomb et al. | | |
| 6,374,502 B1 * | 4/2002 | Holcomb et al. | | 30/417 |
| 6,789,324 B2 | 9/2004 | Linden et al. | | |
| 6,860,016 B2 | 3/2005 | Holcomb et al. | | |
| 7,302,887 B1 * | 12/2007 | Chapman et al. | | 100/234 |

* cited by examiner

*Primary Examiner* — Jimmy T Nguyen
(74) *Attorney, Agent, or Firm* — Seed IP Law Group PLLC

(57) ABSTRACT

Devices and systems for compressing food articles are shown and described. Embodiments of the present invention can be used to squeeze, press, extrude, or otherwise process food articles. The disclosed embodiments can include a lever with a plurality of gear teeth, a base with a plurality of gear teeth, and a receptacle. The gear teeth can engage one another. The lever and base can be actuated to move a piston head into and out of the receptacle to compress food. A piston assembly of the compression tool can provide a mechanical advantage to provide relatively high compressive forces.

17 Claims, 22 Drawing Sheets

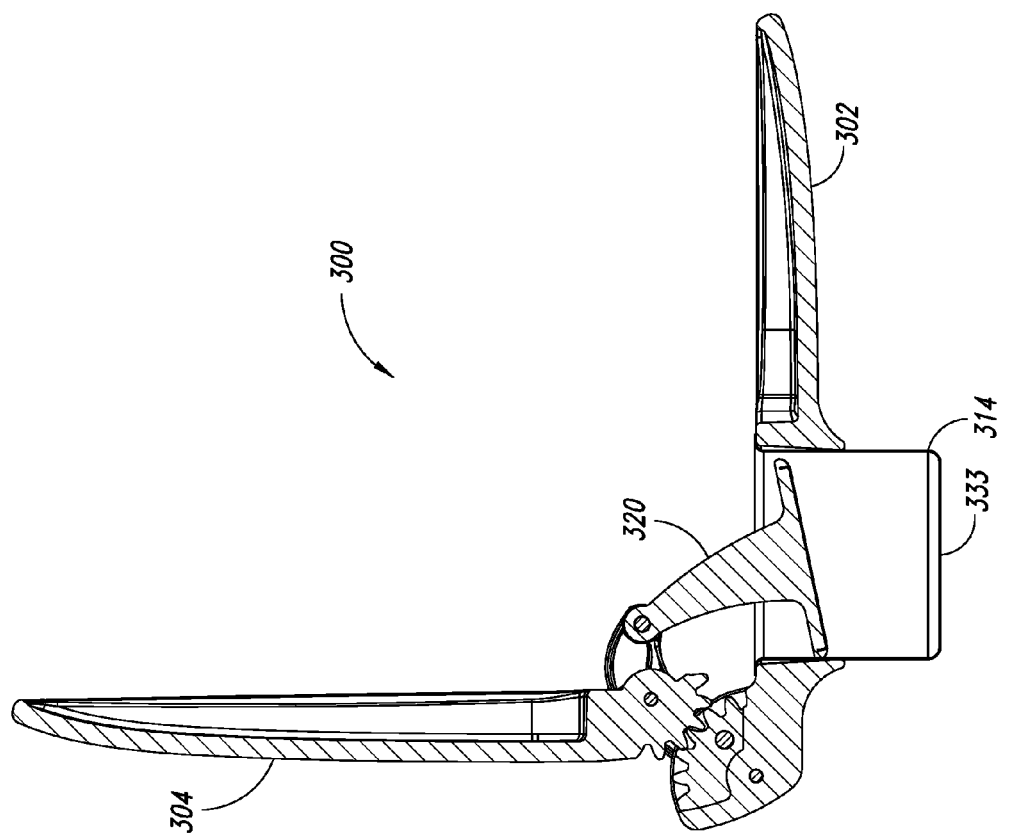

DEVICES AND SYSTEMS FOR COMPRESSING FOOD ARTICLES

CROSS-REFERENCE TO RELATED APPLICATION

This application claims the benefit under 35 U.S.C. §119(e) of U.S. Provisional Patent Application No. 61/159,344 filed Mar. 11, 2009. This provisional application is incorporated herein by reference in its entirety.

BACKGROUND

1. Technical Field

The present disclosure is generally related to kitchen tools. In particular, the present disclosure relates to tools for squeezing, pressing, extruding and otherwise processing food articles.

2. Description of the Related Art

Garlic presses, potato ricers, citrus juicers and the like are generally known in the kitchen product market. The traditional device of this nature has upper and lower arms, with one terminal end of the lower arm hingedly linked to a corresponding terminal end of the upper arm. Opposite the hinge, the arms have a pair of opposing handles. In the case of an orange juicer, the lower arm incorporates a dome along its length for supporting half an orange, and the upper arm incorporates a complementary cup for compressing the orange half against the dome. A user squeezes juice from the orange by squeezing together the handles until the cup approaches the dome. The dome is typically surrounded by a trough to collect the juice and/or other features that channel the juice into a container.

In the case of a garlic press or ricer, the dome is replaced by a receptacle and a piston is linked to the upper arm, opposite the receptacle. When a clove of garlic or potato is placed in the receptacle, the piston is moved against the clove or potato. The handles are squeezed together to force the garlic or potato through apertures in the receptacle.

Due to the size of the traditional device of this nature and the density of the food articles, a significant amount of effort or force must be exerted on such a device in order to squeeze out the juice, press the garlic or rice the potato. It commonly takes both hands to press garlic; it is not uncommon for a person to set a juicer on a table or to couple a ricer to the rim of a cooking pot and use both hands, gravity and his/her body weight to assist in moving the upper arm downward against the lower arm, foregoing altogether any attempt to squeeze together the handles purely by hand. Completing any of these tasks can be difficult or impossible for a person small in stature, the elderly, a person suffering with arthritis, a disabled person, or the like. For many of the latter group of individuals, using traditional devices of this nature is not possible.

BRIEF SUMMARY

At least some embodiments are generally directed to kitchen tools and other devices and systems used to squeeze juice from fruit (e.g., citrus fruit), press food (e.g., garlic), "rice" potatoes, and otherwise process articles of food in order to change the state of the article, remove a portion of the article and/or extract one or more components from the article. In certain embodiments, the kitchen tools are in the form of compression tools.

The compression tool, in some embodiments, is a manually operated handheld tool. The tools include a piston assembly that provides a mechanical advantage to facilitate compression of the food articles. A user can manually operate the compression tool with one or two hands. The compression tool can be conveniently moved between an open position to load/unload a receptacle and a closed position to compress food articles held in the receptacle.

In some embodiments, a device for compressing articles comprises a base, a lever, and a piston assembly. The base has a proximal portion, a distal portion, a receptacle located between the proximal and distal portions, and a plurality of gear teeth located between the distal portion and the receptacle. The receptacle is adapted to receive an article to be compressed. The lever has a proximal portion and a distal portion. The proximal portion of the lever is adapted to facilitate manual manipulation thereof for actuating the device. The distal portion of the lever has a plurality of gear teeth enmeshable with the gear teeth of the base such that pivoting motion of the lever causes movement of the distal portion of the lever about the distal portion of the base. The piston assembly is coupled to the base and the lever. The piston assembly, in some embodiments, includes a piston head positioned between the lever and the receptacle such that movement of the distal portion of the lever causes movement of the piston head relative to the receptacle. In certain embodiments, the piston head moves into and out of the receptacle to compress the article, or articles, in the receptacle.

The device, in some embodiments, is a portable, handheld compression tool configured to press food articles, extract juices from food articles, extrude food articles, or otherwise process food articles. The handheld compression tool can provide a significant mechanical advantage sufficient to ensure a user can apply desired forces to the food articles.

In some embodiments, a compression tool generally comprises a base, a receptacle, a lever, and a piston assembly. The base includes a base handle portion and a base hinge end. The base hinge end has a plurality of gear teeth. The receptacle is configured to receive and hold at least one article of food. The lever is rotatably coupled to the base. The lever includes a lever handle portion and a lever hinge end having a plurality of gear teeth. The piston assembly includes a bracket and a piston head carried by the bracket. The bracket is pivotally coupled to the base hinge end and pivotally coupled to the lever hinge end such that the plurality of gear teeth of the lever engages the plurality of gear teeth of the base. The piston head compresses articles of food held in the receptacle when the lever handle portion is moved towards the base handle portion to cause the plurality of gear teeth of the lever to move along the gear teeth of the base.

In yet other embodiments, a compression tool generally comprises a lever, a base, a receptacle, and a piston assembly. The lever includes a plurality of gear teeth. The base includes a plurality of gear teeth. The receptacle is carried by the base. The piston assembly includes a piston head movable with respect to the receptacle as the lever is moved between a closed position and an open position.

One or more gear assemblies, linkage assemblies, brackets, lever arms, or combinations thereof can connect the lever to the base. In some embodiments, the lever is hingedly coupled to the base. The lever can be pivoted to move the piston head. In some embodiments, the lever and the base include complementary gears that engage one another. A linkage assembly is connected to both the base and the lever and carries the piston head. The linkage assembly provides sufficient leverage to compress food articles in the receptacle.

In some other embodiments, a compression tool comprises a lever, a base, a receptacle, and means for compressing items held in the receptacle. The means for compressing can push the items towards a base or bottom of the receptacle. The means for compressing, in some embodiments, includes a piston head movable through the receptacle as the lever is moved between a closed position and an open position. The means for compressing can include one or more gear trains, gears, brackets, linkages, or piston heads.

BRIEF DESCRIPTION OF THE SEVERAL VIEWS OF THE DRAWINGS

Non-limiting and non-exhaustive embodiments are described with reference to the following drawings. The same reference numerals refer to like parts or acts throughout the various views, unless otherwise specified.

FIG. 14B is a cross-sectional view of the compression tool taken along a line 14B-14B of FIG. 13. The compression tool is in an intermediate configuration.

DETAILED DESCRIPTION

Figure 1:
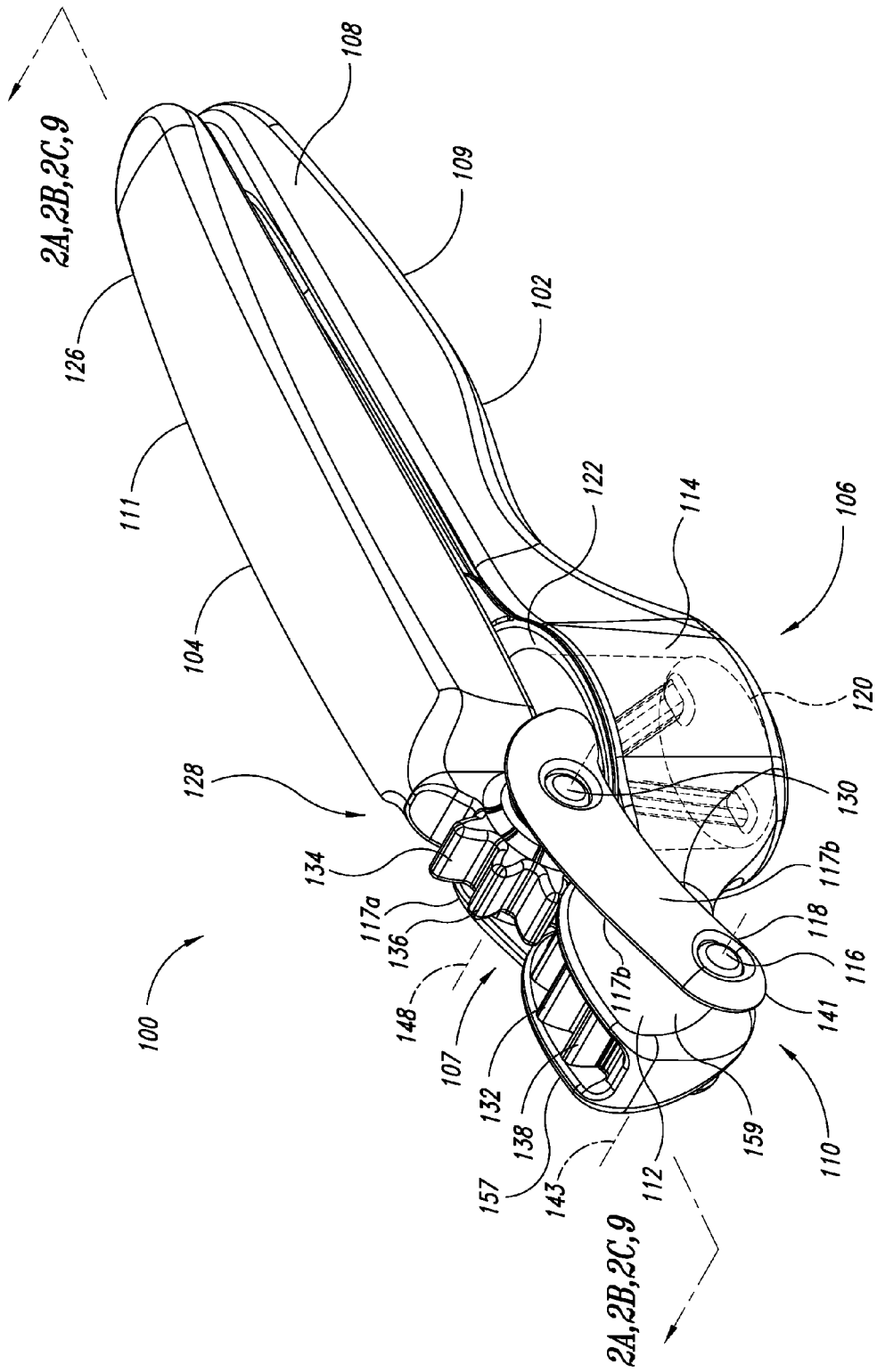
FIG. 1 is an isometric view of a compression tool, in accordance with one embodiment.

Disclosed herein are various embodiments illustrating particular structures and features that can be incorporated in various combinations into devices and systems utilizing the invention as shown and described in the following description and corresponding drawings. An individual of ordinary skill in the relevant art will appreciate, after reviewing the disclosure, that changes can be made to the illustrated embodiments and/or features and can be eliminated therefrom without deviating from the spirit of the invention. Various disclosed embodiments can be used to process (e.g., squeeze, mash, press, rice, extrude, or the like) food articles to change the state of the article, remove a portion of the article, and/or extract one or more components from the article. Some embodiments can be used to press garlic cloves, rice potatoes, fruit juice, or the like.

FIGS. 1 through 7 illustrate one particular embodiment of a compression tool 100. The illustrated exemplary compression tool 100 can be used to press garlic and generally includes a base 102, a lever 104, and a piston assembly 106. The base 102 and lever 104 can be moved relative to one another to open and close the compression tool 100. A gear assembly 107 provides a mechanical advantage so that relatively large compressive forces can be applied to food held in a receptacle 114.

The base 102 and the lever 104 of FIG. 1 each can be formed as a single, monolithic unit, such as molded, cast or forged metal, or the like; they can be assembled from several parts that are joined, fused or otherwise coupled together. Additionally or alternatively, the parts can be coated, over-molded or otherwise treated for comfort, grip, or to suit other design requirements. In some embodiments, the base 102 and the lever 104 include handle portions 109, 111, respectively. The handle portions 109, 111 can be comfortably held in a user's hands. The shapes, configurations, and dimensions of the handle portions 109, 111 can be selected based on a wide of different types of design requirements, including, without limitation, whether the compression tool 100 is for one-handed or two-handed operation, based on the user's hand size, desired operating forces, or the like.

The base 102 extends between a proximal, held end 108 and a distal, hinged end 110, oriented as viewed by a user during operation of the compression tool 100. The held end 108 is thus closer to the user's torso than the hinged end 110 during typical use. The handle portion 109 extends between the held end 108 and the hinged end 110 and, in the illustrated embodiment, is contoured for comfortable manipulation in a user's hand; however, the handle portion 109, or other portions of the base 102, can have other sizes and shapes to adapt the compression tool 100 for other applications, such as one-handed use in which the base 102 rests on a surface and need not be held in the hand during use. For example, the base 102 can include, without limitation, any number of feet for resting on a support surface, a clamp, or the like.

Figure 2A:
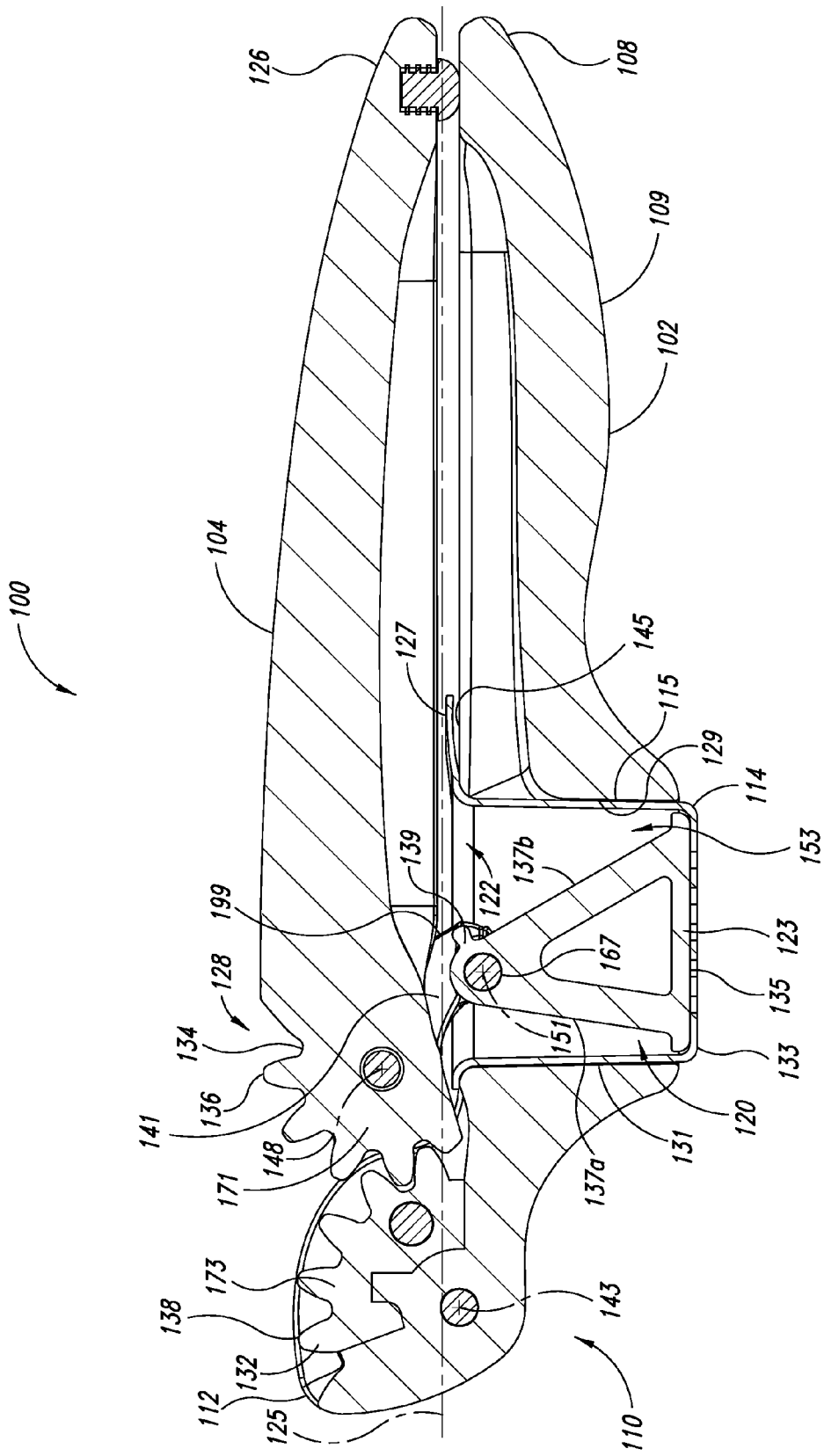
FIG. 2A is a cross-sectional view of the compression tool taken along a line 2A-2A of FIG. 1. The compression tool is in a compression configuration.
Figure 2B:
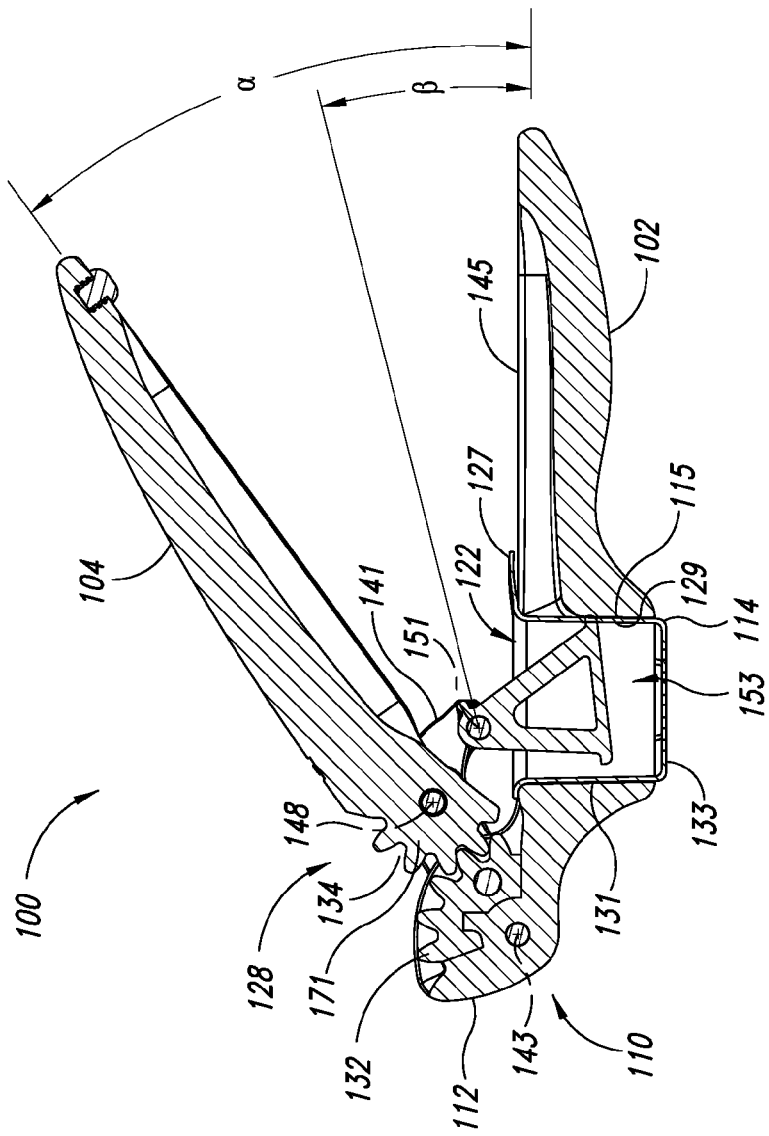
FIG. 2B is a cross-sectional view of the compression tool taken along a line 2B-2B of FIG. 1. The compression tool is in an intermediate configuration.
Figure 2C:
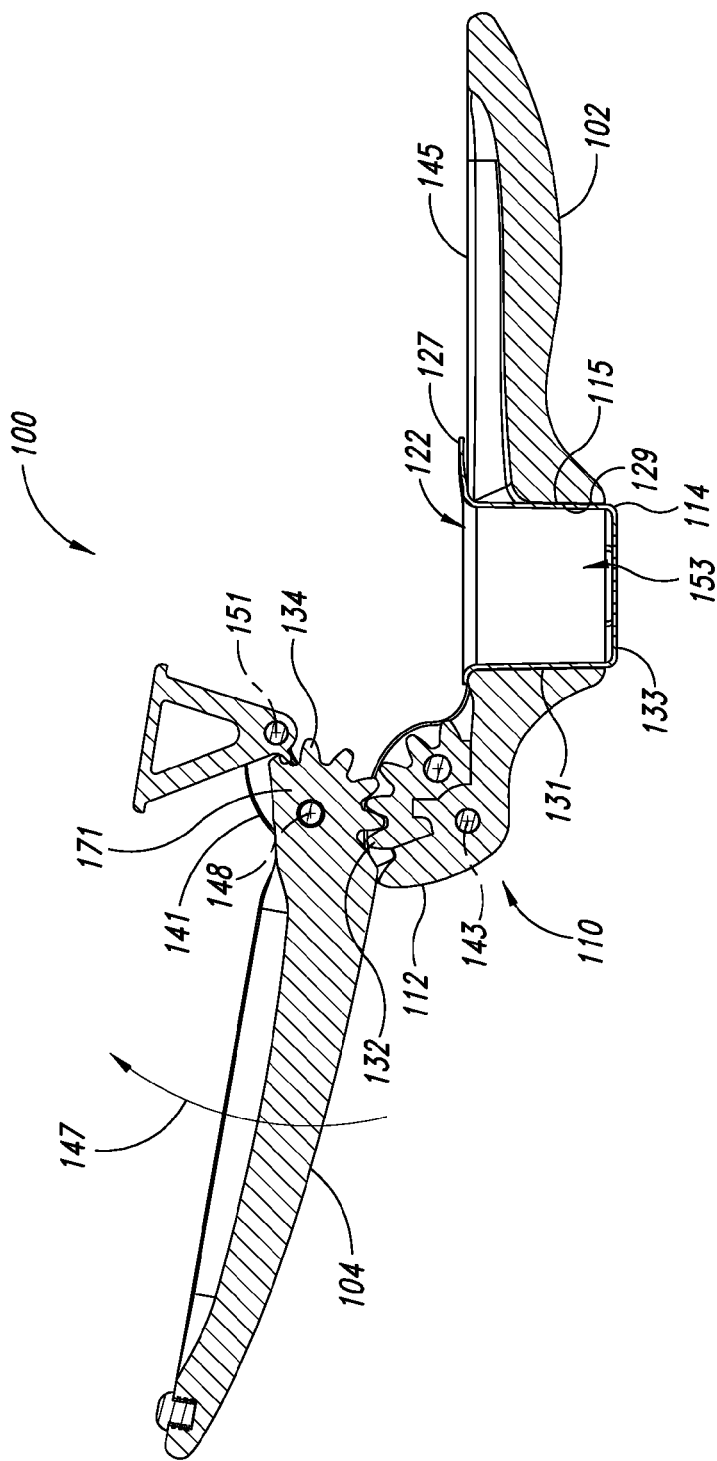
FIG. 2C is a cross-sectional view of the compression tool taken along a line 2C-2C of FIG. 1. The compression tool is in an access configuration.

The hinged end 110 of the base 102 terminates in a head 112. As shown in FIGS. 2A-2C, at least a portion of the head 112 is enlarged and upwardly offset with respect to the length of the base 102. As shown in FIG. 2A, most of the head 112 is located above an imaginary plane 125 positioned generally between the base 102 and the lever 104 when the tool 100 is in a closed or compression configuration. Thus, the handle portion 109 can be positioned on one side of the imaginary plane 125 and a significant portion of the head 112 can be positioned on the other side of the imaginary plane 125. An individual of ordinary skill in the art, after reviewing this disclosure, may appreciate that other head configurations, positions, and orientations may be equally suitable.

Referring again to FIG. 1, the lever 104 extends between a proximal, pivoting end 126 and a distal, hinged end 128. The hinged end 128 of the lever 104 engages the head 112. The illustrated hinged end 128 is hingedly coupled to a piston arm 118 of the piston assembly 106 at a lever hinge 130 positioned along the length of the piston arm 118. The lever hinge 130 defines an axis of rotation 148. The pivoting end 126 of the lever 104 is pivotable about the lever hinge 130 between a closed configuration, shown in FIG. 2A, in which the pivoting end 126 is proximate the held end 108 of the base 104 and an open configuration, shown in FIG. 2C, in which the pivoting end 126 has been pivoted upwards and away from the base 102.

The receptacle 114 is positioned generally between the hinged end 110 and the handle portion 109 of the base 102. In the illustrated embodiment, the receptacle 114 is positioned proximate the hinged end 110 to enhance (e.g., to maximize) the benefit experienced by the user due to the leverage provided by the compression tool 100. The position of the receptacle 114 relative to other features can be selected to achieve the desired mechanical advantage and movement of the piston assembly 106. One of ordinary skill in the art, having reviewed this disclosure, will thus appreciate that the receptacle 114 can be positioned elsewhere along the base 102 and at different orientations without deviating from the spirit of the invention.

Figure 3:
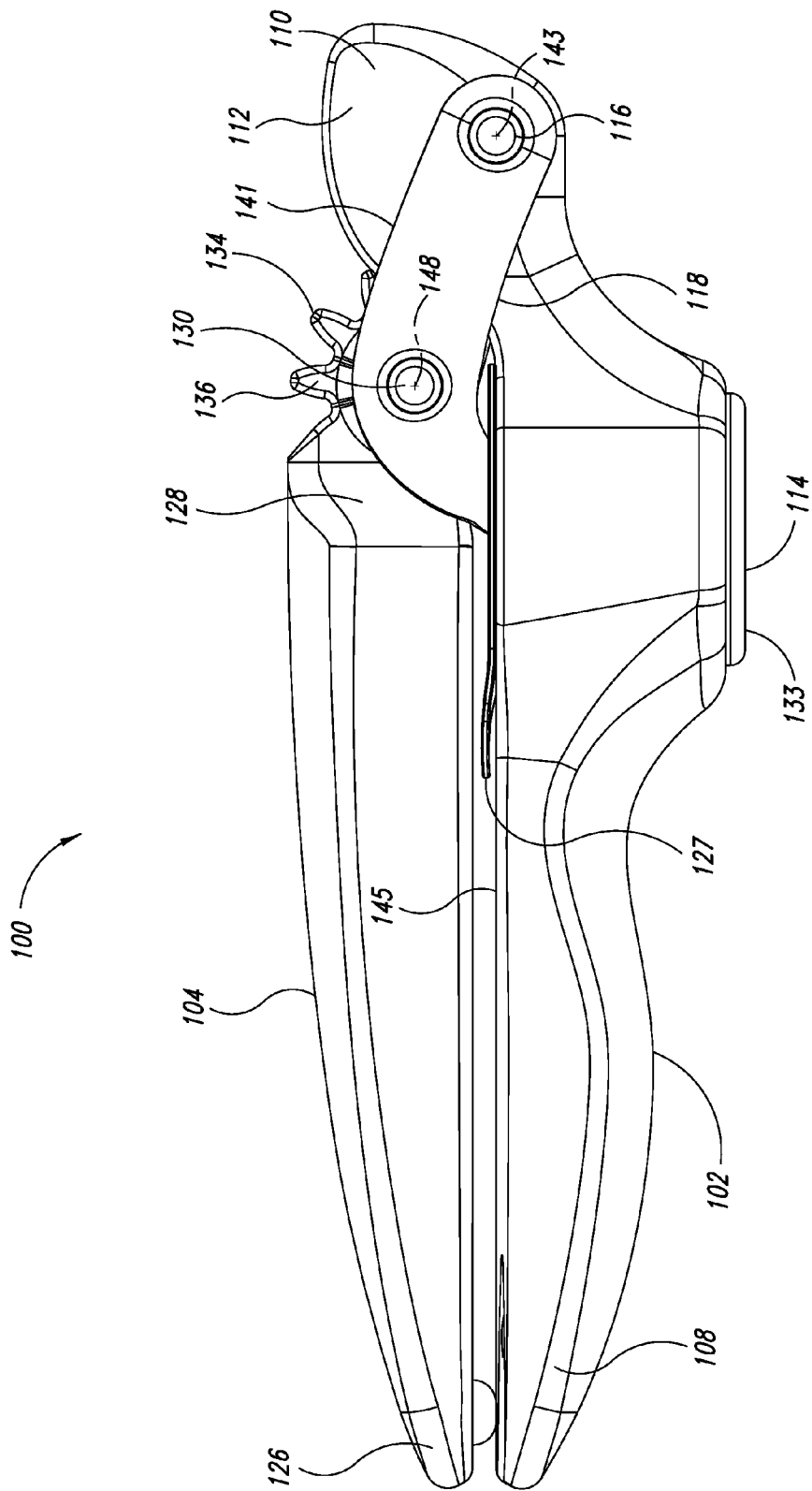
FIG. 3 is a side elevational view of the compression tool of FIG. 1.
Figure 4:
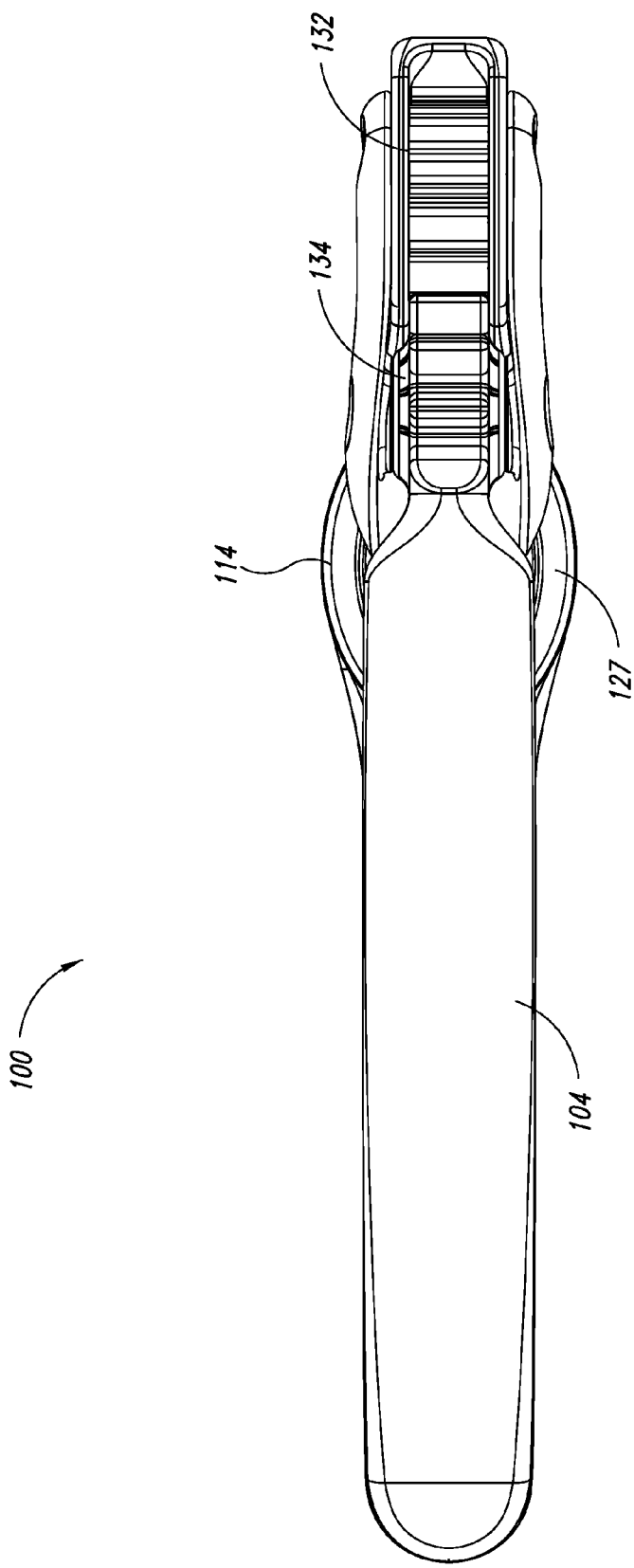
FIG. 4 is a top plan view of the compression tool of FIG. 1.

Referring to FIGS. 2A-4, the receptacle 114 includes a main body 115 having an opening or mouth 122 an outwardly extending lip 127. The main body 115 is positioned in a receiving hole 129 of the base 102. The lip 127 extends generally radially outward away from the mouth 122 and rests on an upper surface 145 of the base 102. A generally cylindrical sidewall 131 extends downwardly from the lip 127 to a base or a bottom 133. As shown in FIG. 3, the bottom 133 protrudes outwardly from the receiving hole 129. To remove the receptacle 114, a user can push the receptacle 114 upwardly out of the base 102. Advantageously, the receptacle 114 can be removed to wash it separately from other components of the compression tool 100. For example, the receptacle 114 can be washed in a dishwasher while the other components of the compression tool 100 are hand washed. In other embodiments, the base 102 and the receptacle 114 can form a monolithic unit and can be washed together.

Figure 5:
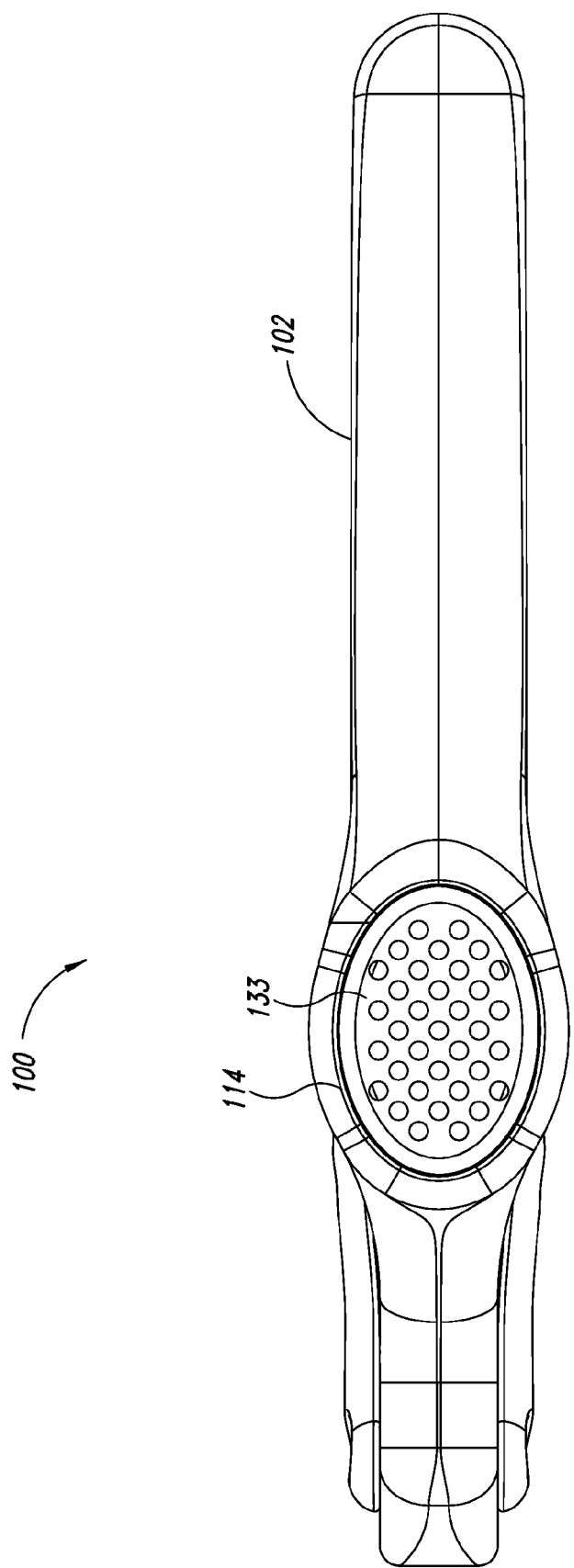
FIG. 5 is a bottom view of the compression tool of FIG. 1.

As shown in FIG. 5, the bottom 133 is perforated. Garlic, dough, potato, or other items can be extruded through an array of apertures in the bottom 133. The illustrated apertures are circular through-holes that are generally evenly spaced from one another. The number, sizes, shapes, configurations, and pattern of the apertures can be selected based on the desired food processing. By way of example, the sizes of the apertures for ricing potatoes can be different from the sizes of the apertures for extruding garlic.

Referring again to FIG. 2A, a piston head in the form of a plunger 120 includes a press plate 123 surrounded by the generally cylindrical sidewall 131 of the receptacle 114. The press plate 123 has a generally planar lower surface 135 for pressing food against the bottom 133. A pair of legs 137a, 137b (collectively "137") extend upwardly from the press plate 123 and meet to form a junction 139 pivotally coupled to a bracket assembly 141 of the piston assembly 106.

A wide range of different types of press plates can be used. For example, the press plate 123 can be curved, partially spherical (dome-shaped), or have any other shape or configuration suitable for processing food. The illustrated press plate 123 has a generally elliptical shape, as viewed from above. The complementary shaped receptacle 114 closely receives the press plate 123. In other embodiments, the press plate 123 has a generally circular shape, polygonal shape (e.g., a square shape, a rectangular shape, etc.), or the like.

Referring to FIGS. 1-3, the bracket assembly 141 is rotatable about an axis of rotation 143. The lever 104 is rotatable with respect to the bracket assembly 141 about the axis of rotation 148. The plunger 120 is rotatable with respect to bracket assembly 141 about an axis of rotation 151 (see FIGS. 2A-2C) defined by a piston head pin 167.

In some embodiments, including the illustrated embodiment of FIG. 2A, the axes of rotation 143, 151 are on one side of the imaginary plane 125 and the axis of rotation 148 is on the other side of the imaginary plane 125 when the compression tool 100 is closed. In other embodiments, one or both of the axes of rotation 143, 151 can be proximate to or lie in the imaginary plane 125 and the axis of rotation 148 can be offset a desired distance from the imaginary plane 125. The axes of rotation 143, 148, 151 can also be at other positions.

Figure 6:
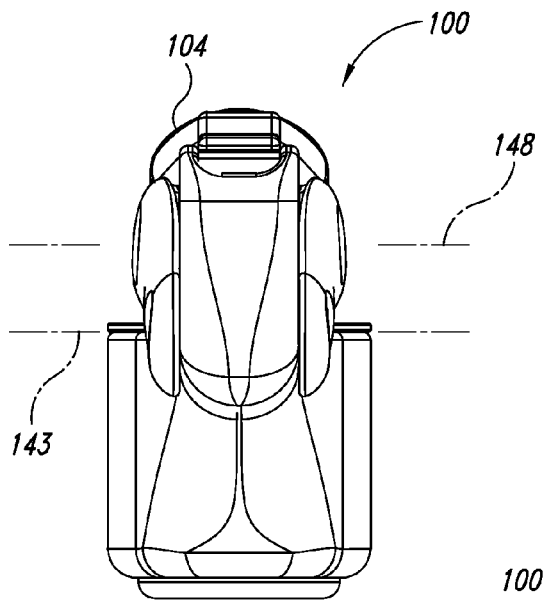
FIG. 6 is a front view of the compression tool of FIG. 1.
Figure 7:
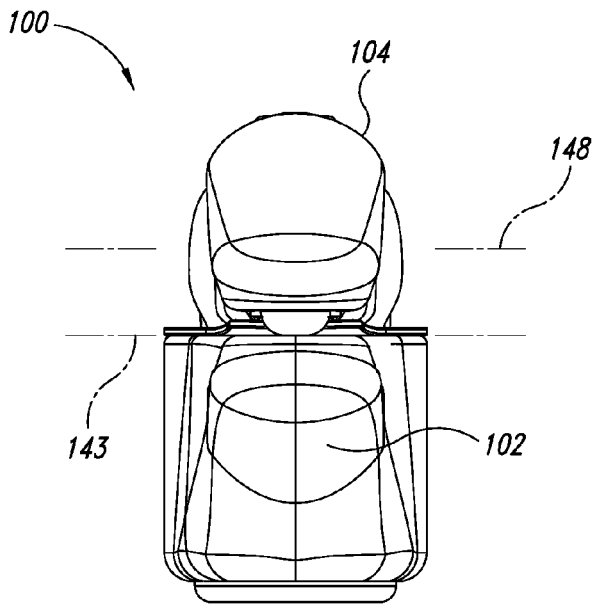
FIG. 7 is a back view of the compression tool of FIG. 1.

As shown in FIGS. 6 and 7, the axes of rotation 143, 148 can be generally parallel to one another. (The axis of rotation 151 is not shown in FIGS. 6 and 7.) The axis of rotation 151 can be generally parallel to the axes of rotation 143, 148.

To keep the plunger 120 properly positioned in the receptacle 114 as the plunger 120 moves though a receptacle chamber 153, the plunger 120 pivots freely about the axis of rotation 151. A pin 167 or other component can pivotally couple the plunger 120 to the bracket assembly 141. In other embodiments, the plunger 120 is rotationally fixed with respect to the bracket assembly 141 or the piston arm 118.

Referring again to FIG. 1, the bracket assembly 141 includes a piston or base hinge 116, the piston arm 118, and the lever hinge 130. The lever hinge 130 is generally positioned between the piston hinge 116 and the piston head pin 167 with respect to a length of the base 102 when the compression tool 100 is closed, as shown in FIG. 2A. One terminal end of the illustrated piston arm 118 is pivotally linked to the piston hinge 116 and an opposing end of the piston arm 118 terminates at the plunger 120. The piston arm 118 can be in the form of spaced apart linkages 117a, 117b (collectively "117"). The head 112 and the hinged end 128 are positioned between and aligned by the linkages 117 such that the pivoting end 126 is movable downwardly and towards the held end 108 of the base 102 to move the plunger 120 arcuately towards a compression position. The illustrated linkages 117 are pivotally linked to the head 112 at the piston hinge 116. The piston hinge 116 can include, without limitation, a pin that extends through the linkages 117 and the head 112. Other types of piston arms and hinge pins can also be used, if needed or desired.

The linkages 117 can be rigid linkages made of metal, plastic, composites, combinations thereof, or the like. In the illustrated embodiment, the linkages 117 have a distal end coupled to the hinged end 110 of the base 102, a central region pivotally coupled to the hinged end 128 of the lever 104, and a proximal end 199 (see FIG. 2A) that carries the plunger 120. The linkages 117 can be a single, monolithic part; the piston head can be fixedly attached to the piston arm; or the piston head can be pivotally coupled thereto, the specific design depending on, among other factors, user preference, design tolerances, and the size, shape and configuration of the particular compression tool 100 and its various parts.

The base 102 and the lever 104 cooperate to form the gear assembly 107. The gear assembly 107 of FIG. 1 includes a fixed gear 132 of the base 102 and a gear 134 of the lever 104.

The fixed gear 132 extends around a portion of the head 112 of the base 102. The fixed gear 132 is operatively enmeshed with the gear 134, illustrated as an orbiting gear, which extends around a portion of the hinged end 128 of the lever 104. The fixed gear 132 and gear 134 can be separate components that are fixedly coupled to the base 102 and the lever 104, respectively. Alternatively, the fixed gear 132 and the gear 134 can be monolithically formed with the base 102 and the lever 104, respectively.

Guides 157, 159 of the head 112 of FIG. 1 can help keep the gear 134 aligned with the fixed gear 132. The illustrated guides 157, 159 are plates on either side of the fixed gear 132. Other types of guides can also be used. The distance between the guides 157, 159 can be slightly greater than or almost the same as a width of the gear 134 such that teeth 136 of the gear 134 remain enmeshed with teeth 138 of the fixed gear 132 during use.

The illustrated piston hinge 116 extends through the guide 157, the fixed gear 132, and the guide 159. The lever hinge 130 extends through the gear 134. The piston hinge 116, lever hinge 130, and the linkages 117 cooperate to keep the teeth 136, 138 properly mated.

The gear 134 of FIGS. 2A-2C includes the plurality of teeth 136 that project outwardly from a gear body 171 and are radially symmetric with respect to the lever hinge 130 such that the gear 134 and the axis of rotation 148 are generally coaxial. As a result, the lever 104 and the gear 134 rotate coaxially about the axis of rotation 148. Because the gear 134 is hingedly coupled to the piston arm 118 at the lever hinge 130, the gear 134 tracks along the fixed gear 132 as the lever 104 is pivoted. In the illustrated embodiment, the gear 134 rolls along the fixed gear 132.

The fixed gear 132 includes the plurality of fixed gear teeth 138 that project outwardly from a gear body 173 and are radially symmetric with respect to the piston hinge 116 such that the fixed gear 132 and the axis of rotation 143 are generally coaxial. As a result, the piston arm 118 pivots, and with it the lever hinge 130 orbits, around the head 112 about the axis of rotation 143 coaxial with the fixed gear 132.

The fixed gear 132 and the gear 134 can be monolithically formed with the base 102 and lever 104, respectively. In other embodiments, the fixed gear 132 and gear 134 can be separate components that can be replaced, if needed or desired. For example, the fixed gear 132 can be bonded, adhered, pinned, or otherwise coupled to the head 112.

The compression tool 100 is configured such that the plunger 120 is in the access configuration when the lever 104 is in the open configuration and the piston head is in the compressed configuration when the lever 104 is in the closed configuration. As described in more detail below, the gear assembly 107 converts pivoting motion of the lever 104 into generally arcuate motion of the piston arm 118 and, with it, the plunger 120, and operates to reduce the amount of effort needed to manipulate the tool 100. The gear assembly 107 can provide significant mechanical advantage as compared to conventional presses. In some embodiments, the compression tool 100 can apply larger compressive forces than conventional devices for the same user-applied force, thereby making the tool 100 suitable for operation by a wide range of individuals, including a person small in stature, an elderly person, a person suffering with arthritis, a disabled person, children, or the like.

Figure 8:
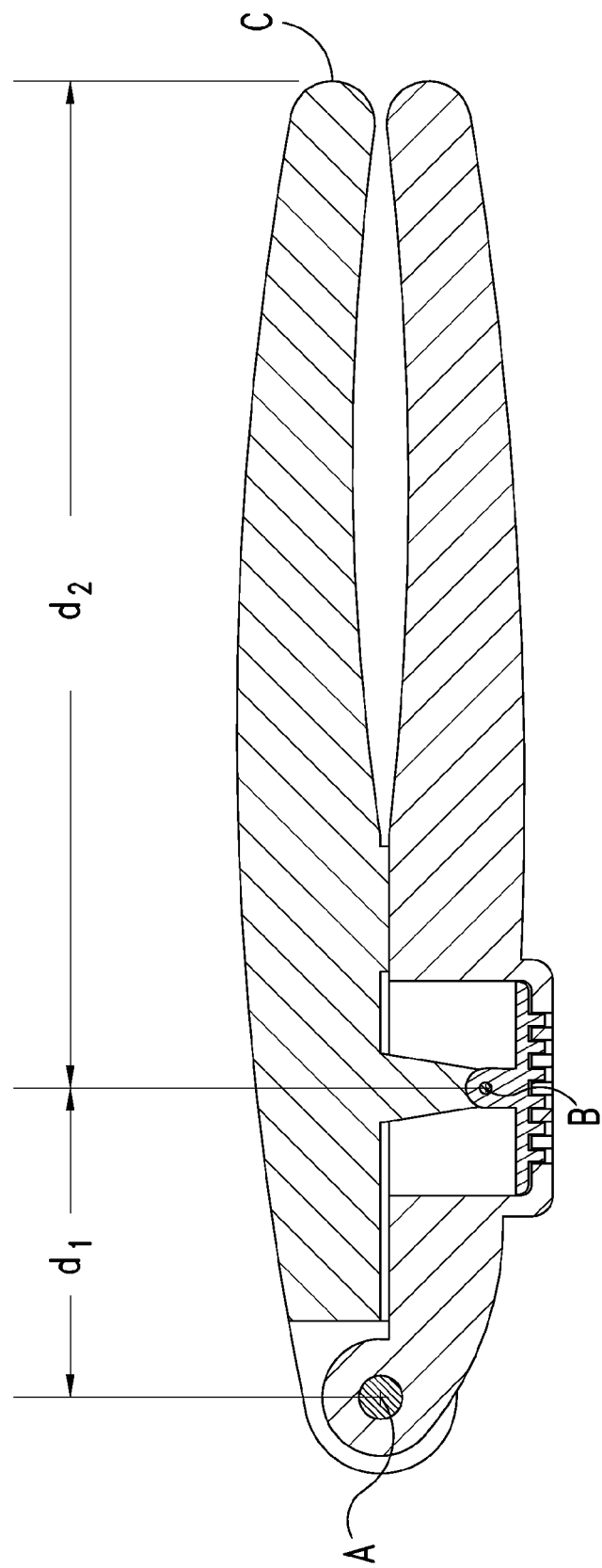
FIG. 8 shows dimensional relationships of a conventional garlic press.

In traditional garlic presses, a rigid upper arm and a rigid lower arm meet at a single hinge and a piston is coupled to the rigid upper arm. FIG. 8 shows a conventional garlic press that includes a rigid upper arm that extends all the way from point "A" to point "C," and a piston that is linked to the rigid upper arm at point "B." A first short distance d1 between the hinge (A) and the piston (B) is roughly 25% of a long distance d2 between the piston and the terminal end (C).

By comparison, the compressor 100 (shown schematically in FIG. 9) has a second short distance d3 between the hinged end 128 of the lever 104 (where the gears 132, 134 contact each other) and the piston 120 that is roughly 10% of the long distance d2 between the piston and the terminal pivoting end 126 of the lever 104.

Figure 9:
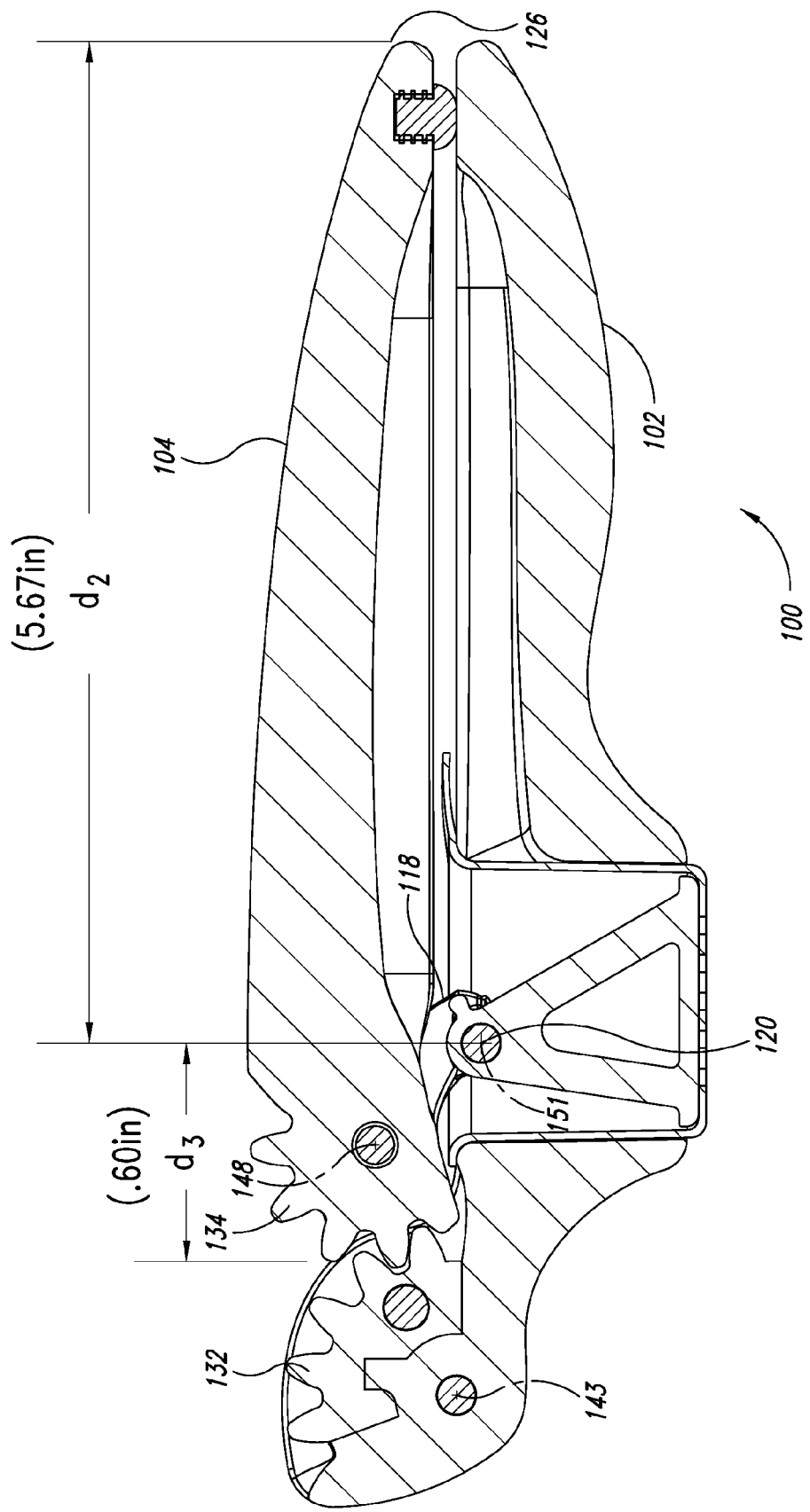
FIG. 9 is a cross-sectional view of a compression tool with certain dimensions labeled, in accordance with one embodiment. The cross-sectional view is taken along a line 9-9 of FIG. 1.

In both devices the long distance (d2) is essentially the same. A significant difference between the illustrated compression tool 100 and the prior art is the short distance: the second short distance (d3) of the embodiment of FIG. 9 is less than half the first short distance (d1) of the prior art. As a result, the compressive force exerted by the plunger 120 of the compression tool 100 can be considerably greater than the force exerted by the traditional presses of the prior art.

One method of using the compression tool 100 is now discussed in connection with FIGS. 2A-2C. To load the compression tool 100 with food articles, the compression tool 100 can be moved to an access configuration. The user can pivot the lever 104 away from the base 102 so that the piston arm 118 rotates about the axis of rotation 143 to move both the hinged end 128 of the lever 104 and the plunger 120. The axes of rotation 148, 151 move along generally curved paths such that the plunger 120 moves generally arcuately between a compression position (see FIG. 2A) and an access position (see FIG. 2C). The path of travel of the plunger 120 can be selected based on the configuration and position of the receptacle 114.

In the access configuration, the piston arm 118 has been rotated upwardly and away from the base 102 and the plunger 120 is external to the receptacle 114. The plunger 120 in FIG. 2C is spaced apart from the mouth 122 to allow for the loading of food articles into the receptacle 114 and the removal of residue therefrom. The user can manually load food articles (e.g., one or more cloves of garlic) into the receptacle 114.

The tool 100 can then be moved to the compression configuration. To move the plunger 120 from the access position towards the compression position, the lever 104 is rotated about the axis of rotation 148 towards the base 102, as indicated by an arrow 147 in FIG. 2C. As the plunger 120 approaches the bottom 133, the food articles are compressed and ultimately pushed through the apertures in the bottom 133. In the compression configuration, the plunger 120 is proximate to or in contact with the bottom 133. After pushing the food through the bottom 133, the compression tool 100 can be moved back to the access configuration to clean the receptacle 114 (e.g., remove residue), reload the receptacle 114, or the like.

In some embodiments, the rotational speed of level 104 is different from the rotational speed of the bracket assembly 141 and the plunger 120. FIGS. 2B and 2C show that the angles of rotation of the lever 104 are greater than the angles of rotation of the bracket assembly 141. Referring to FIG. 2B, when the lever 104 has rotated an angle $\alpha$, the bracket assembly 141 has rotated an angle $\beta$ that is less than the angle $\alpha$. In some embodiments, the angle $\beta$ is equal to or less than about half of the angle $\alpha$. A ratio of the angle $\alpha$ to the angle $\beta$ can be equal to or greater than about 5, 3, 2, 1.5, or 1. In some embodiments, including the illustrated embodiment of FIG. 2B, when the angle $\beta$ is in a range of about 12 degrees to about 15 degrees, the angle $\alpha$ can be in the range of about 30 degrees to about 35 degrees. As such, the angle of rotation $\beta$ of the bracket assembly 141 is less than a corresponding angle of rotation $\alpha$ of the lever 104 about the lever axis of rotation 148.

When the user rotates the lever 104, the lever 104 and the bracket assembly 141 are rotated at different angular speeds. The gear assembly 107 serves as a gear reducer that provides a gear reduction to reduce the angular speed of the bracket assembly 141 while increasing the force applied by the plunger 120. Different types of gear reducers with any number of gears (e.g., spur gears, planetary gears, worm gears, or the like), levers, bearings, or the like can be used.

Figure 10:
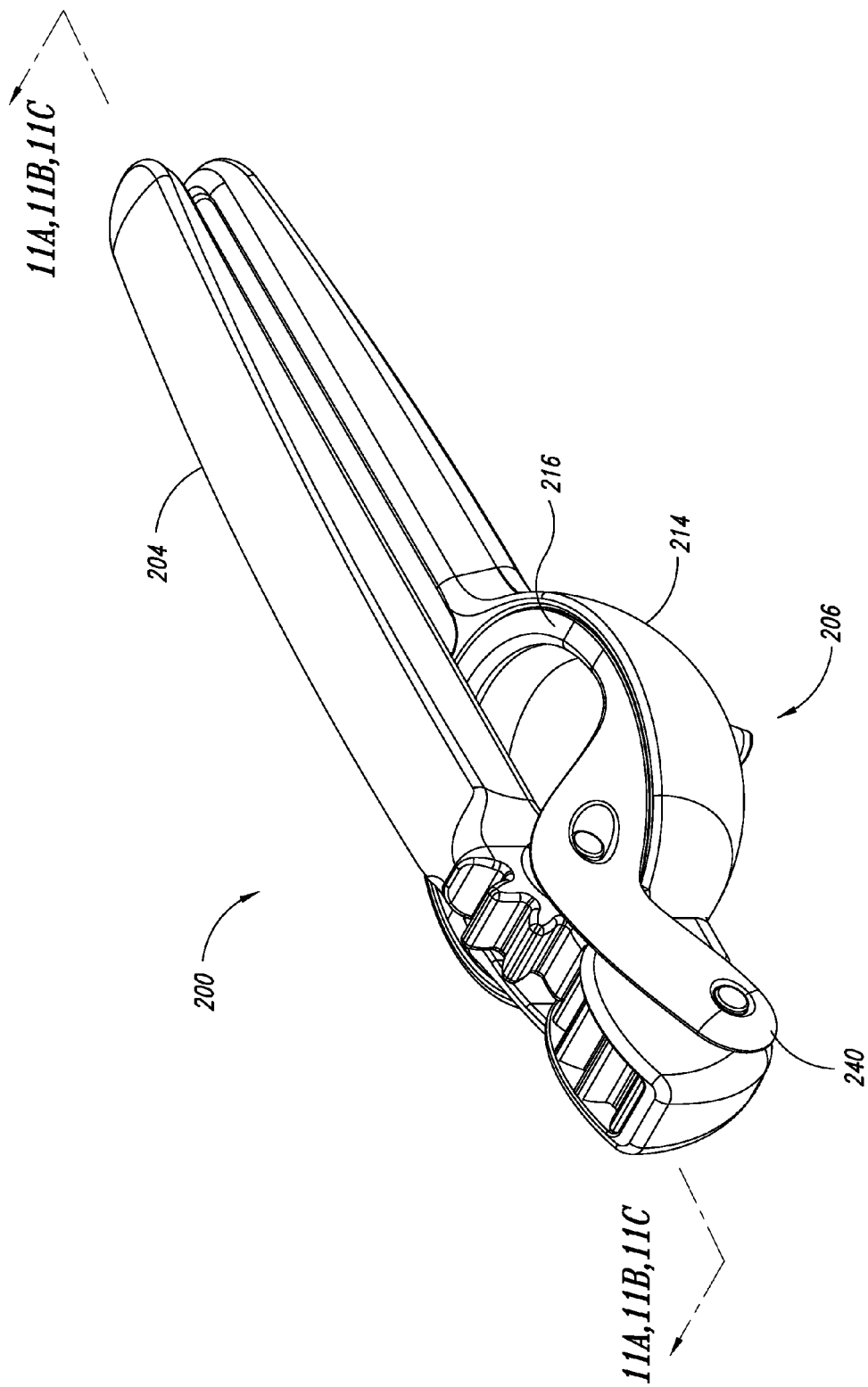
FIG. 10 is an isometric view of a compression tool for juicing, in accordance with one embodiment.
Figure 11A:
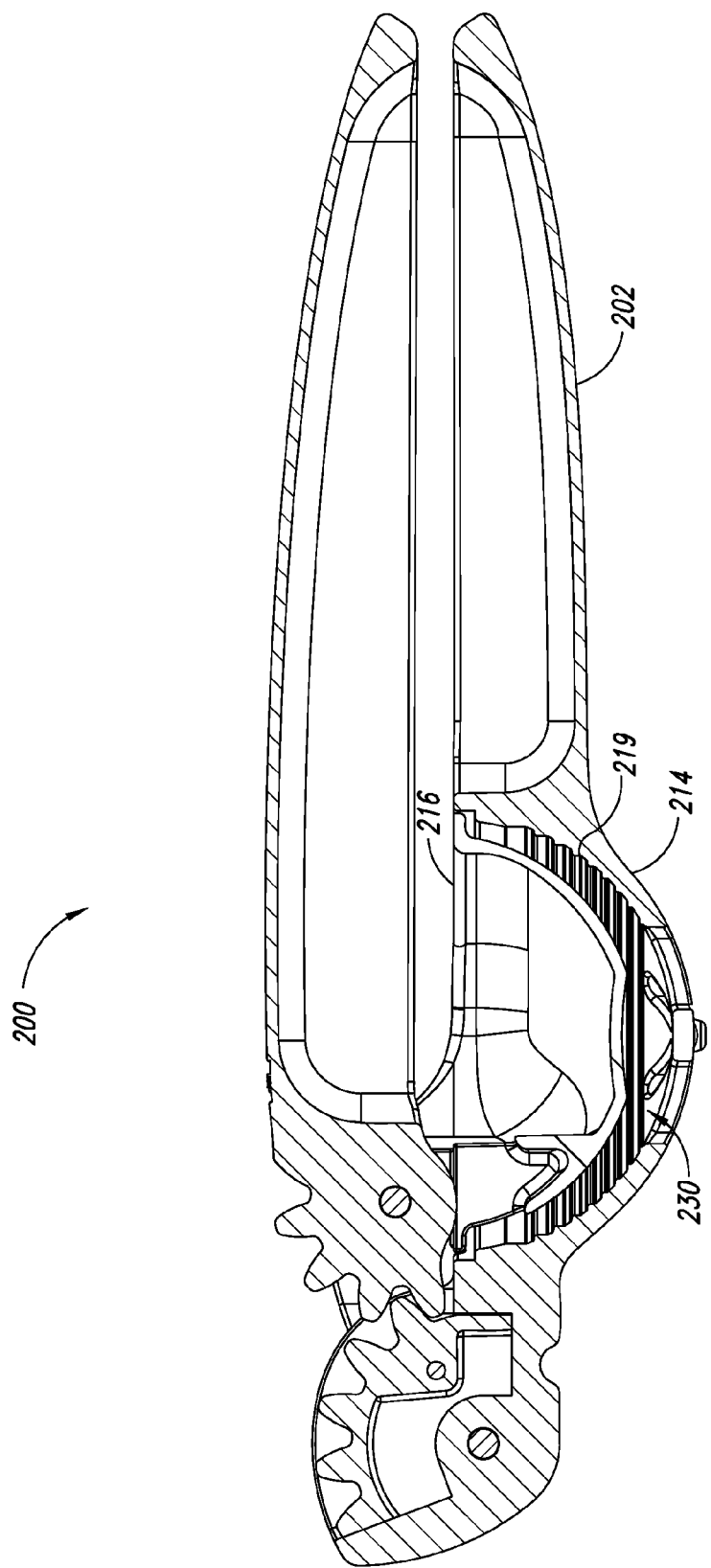
FIG. 11A is a cross-sectional view of the compression tool taken along a line 11A-11A of FIG. 10. The compression tool is in a compression configuration.
Figure 11B:
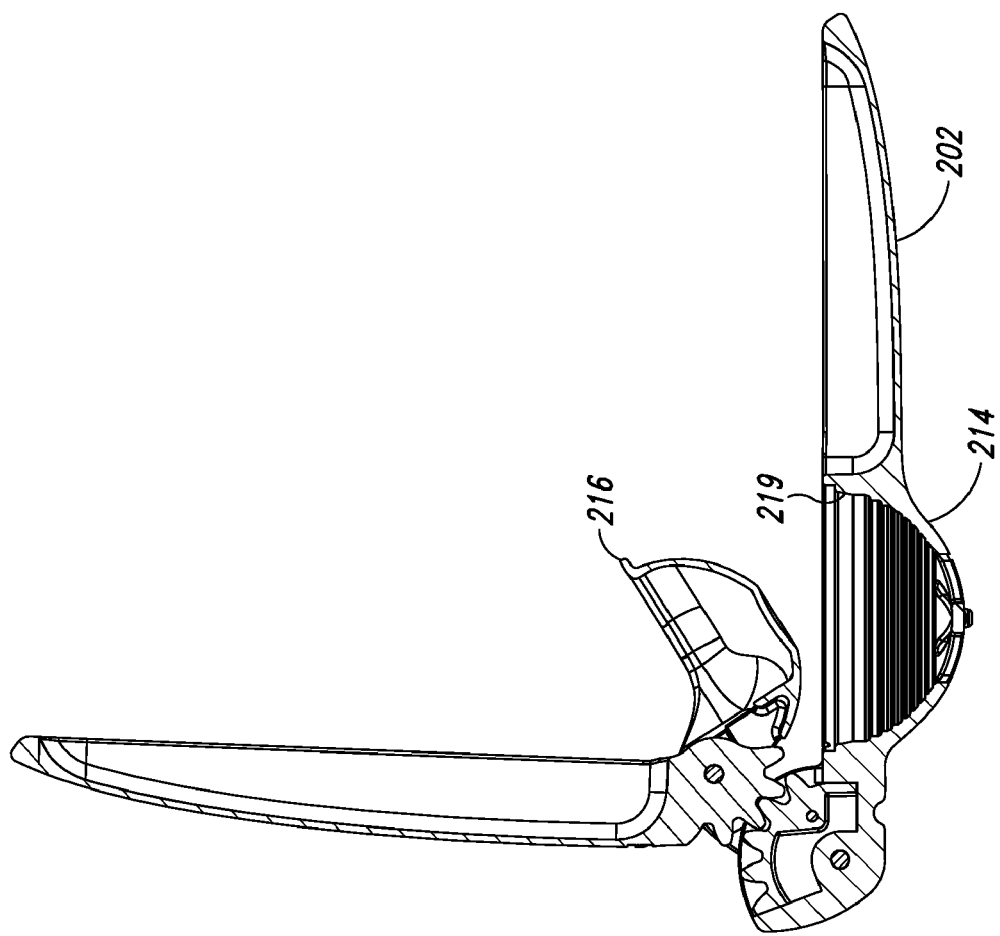
FIG. 11B is a cross-sectional view of the compression tool taken along a line 11B-11B of FIG. 10. The compression tool is in an intermediate configuration.
Figure 11C:
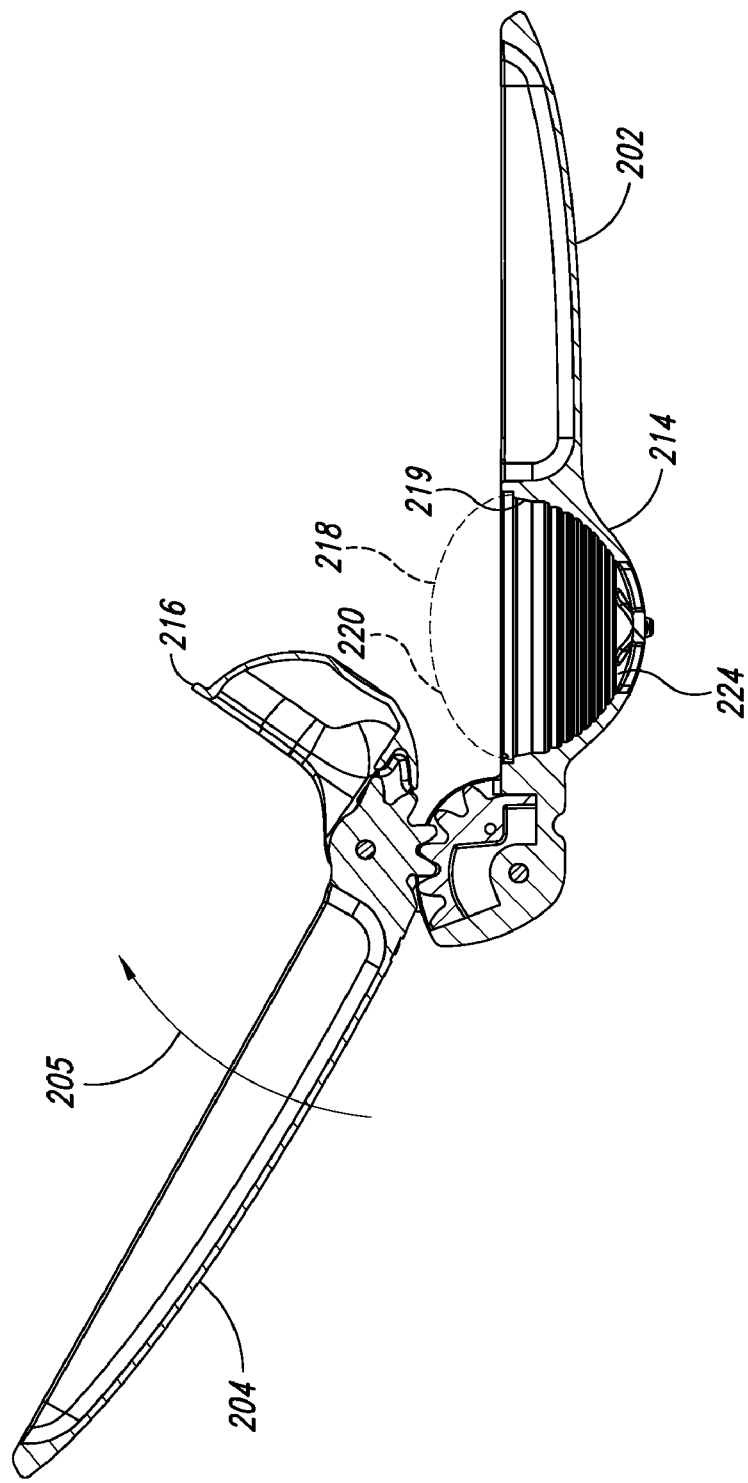
FIG. 11C is a cross-sectional view of the compression tool taken along a line 11C-11C of FIG. 10. The compression tool is in an access configuration.
Figure 12:
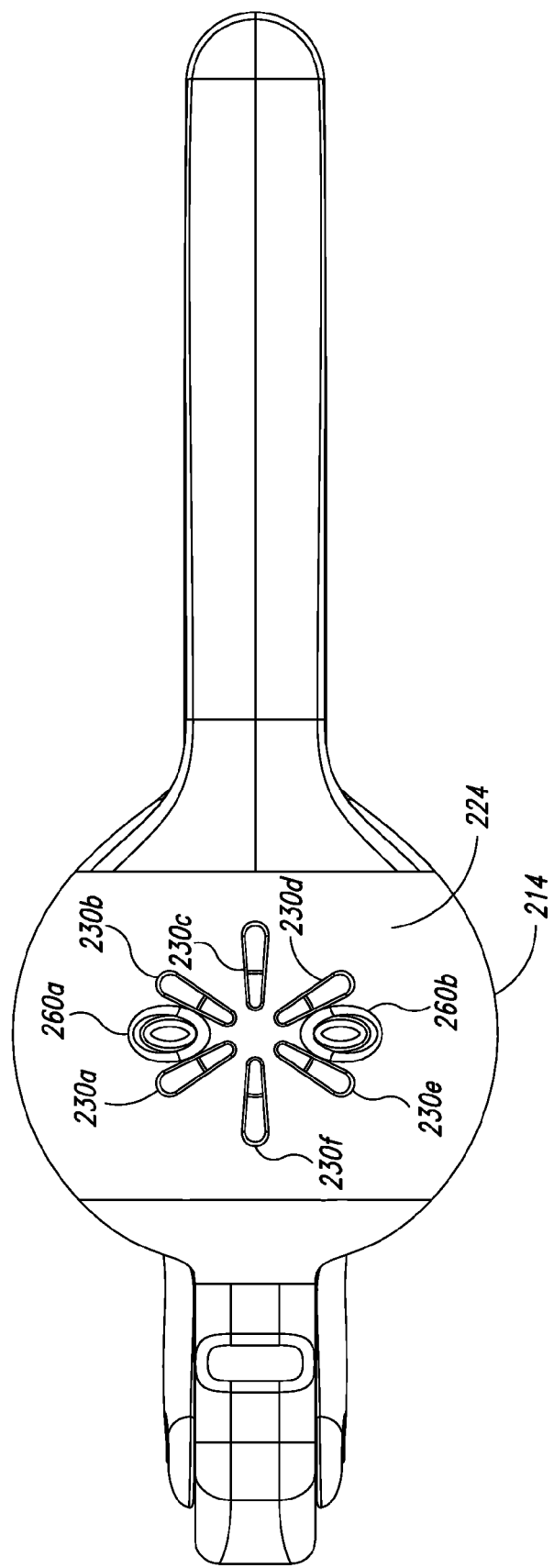
FIG. 12 is a bottom view of the compression tool of FIG. 10.
Figure 13:
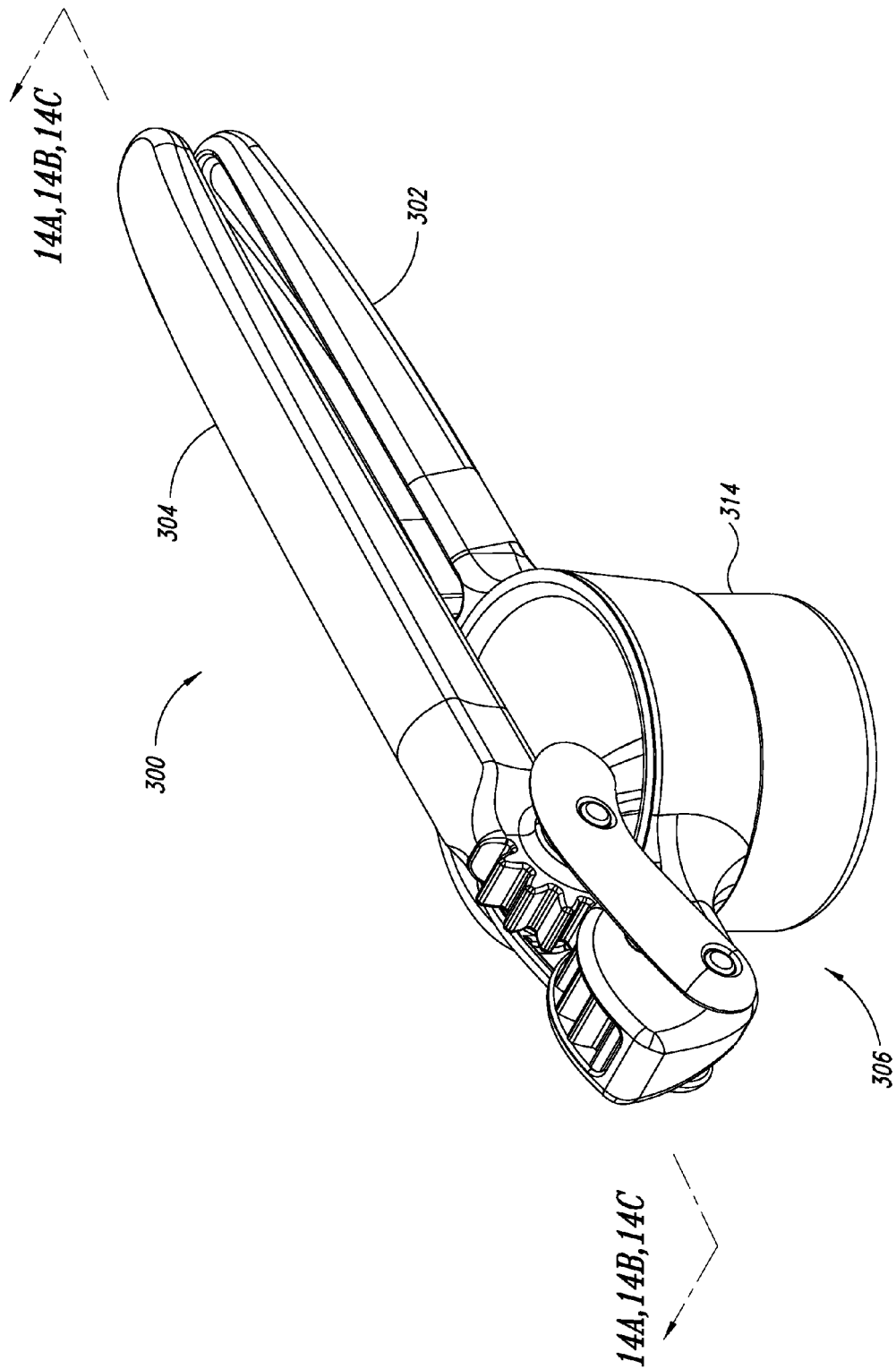
FIG. 13 is an isometric view of a compression tool in the form of a potato ricer, in accordance with one embodiment.

FIGS. 10-12 illustrate another embodiment of the present invention, in the form of a juicer that takes advantage of a mechanism similar to that of the compression tool 100 described in connection with FIGS. 1-7 and 9. For example, the offset, positioning of a pair of meshed gears between the location of the hinge and the location of a dome/cup increases the leverage that a lever 204 exerts on the food article being squeezed.

FIG. 10 shows a compression tool 200 including a receptacle 214 that mates with a complementary shaped piston head in the form of a cup 216. As shown in FIGS. 11A-11C, the receptacle 214 is a partially spherical shaped dome that is slightly larger than the partially spherically shaped cup 216. When the compression tool 200 is in the access configuration, as shown in FIG. 11C, a piece of a citrus fruit (e.g., an orange half, lemon half, etc.) can be placed on a concave surface 219 of the receptacle 214. The lever 204 can be moved in the direction indicated by an arrow 205 of FIG. 11C towards a base 202 to close the tool 200.

Referring to FIG. 10, the cup 216 can be integrally formed with a bracket assembly 240 of a piston assembly 206 and can be formed via a machining process, molding process (e.g., injection molding process, compression molding process, etc.), or the like and can be made of metal, plastic, or the like. In other embodiments, the cup 216 and the bracket 240 are separate components that can be fixedly or pivotally coupled together.

The cup 216 can be brought into contact with a piece of fruit 218 (e.g., a piece of an orange, a lemon, a grapefruit, etc.), illustrated in dashed line in FIG. 11C as half of a citrus fruit. An outer surface 220 (e.g., the skin) of the fruit 218 can face upwardly. The flesh of the fruit 218 can face a bottom 224 of the receptacle 214. The cup 216 can push the fruit 218 towards the bottom 224 to squeeze juices from the fruit 218. As the compression tool 200 is closed, the piece of fruit can be pushed inside out so as to provide generally uniform compression. The cup 216 and receptacle 114 thus cooperate to extract juices. The extracted juices can flow through apertures 230a, 230b, 230c, 230d, 230e, 230f (collectively "230"), as shown in FIG. 12. The fruit can also be in other orientations.

Referring again to FIG. 11A, the receptacle 214 illustrated as a dome can be monolithically formed with the base 202. The concave surface 219 includes circumferentially extending annular grooves. The annular grooves can facilitate the juicing process and can be V-shaped grooves, U-shaped grooves, or the like. Additionally or alternatively, the surface 219 can include one or more ridges, protrusions, recesses, troughs, or other features that promote or facilitate juicing or the collection of juices. In yet other embodiments, the surface 219 can be a generally smooth, featureless surface (e.g., a partially spherical surface without any grooves or other types of features).

FIG. 12 shows feet 260a, 260b (collectively "260") coupled to the receptacle 214. The feet 260 protrude downwardly. To help stabilize the compression tool 200, the user can keep the feet 260 on the support surface while the lever 204 is moved upwardly and/or downwardly. Alternatively, the compression tool 200 can be held away from a support surface during operation.

When juicing, a collection container can be positioned below the apertures 230 to catch the extracted juices. The feet 260 can be used to limit, minimize, or substantially prevent relative movement between the compression tool 200 and the collection container. The collection container can be a pitcher, a glass, a cup, a bowl, or the like.

FIGS. 13-17 illustrate another embodiment of the present invention, in the form of a potato ricer that takes advantage of an embodiment of the inventive mechanism similar to those of the press and juicer described in connection with FIGS. 1-7 and 9-12. A compression tool 300 includes a piston assembly 306 and a receptacle 314. The receptacle 314 can be generally similar to the receptacle 114 as discussed in connection with FIGS. 1-7 and 9. However, the receptacle 314 can be larger to accommodate larger food articles, such as whole potatoes or large potato pieces. For example, the receptacle 314 can have an inner diameter in a range of about 1 inch to about 4 inches. The receptacle 114 discussed in connection with FIGS. 1-7 and 9 can have an inner diameter in a range of about 0.25 inch to about 2.5 inches. Of course, other dimensions are also possible, if needed or desired. A user can select the width, shape, and depth of the receptacles based on the food to be processed.

Figure 14A:
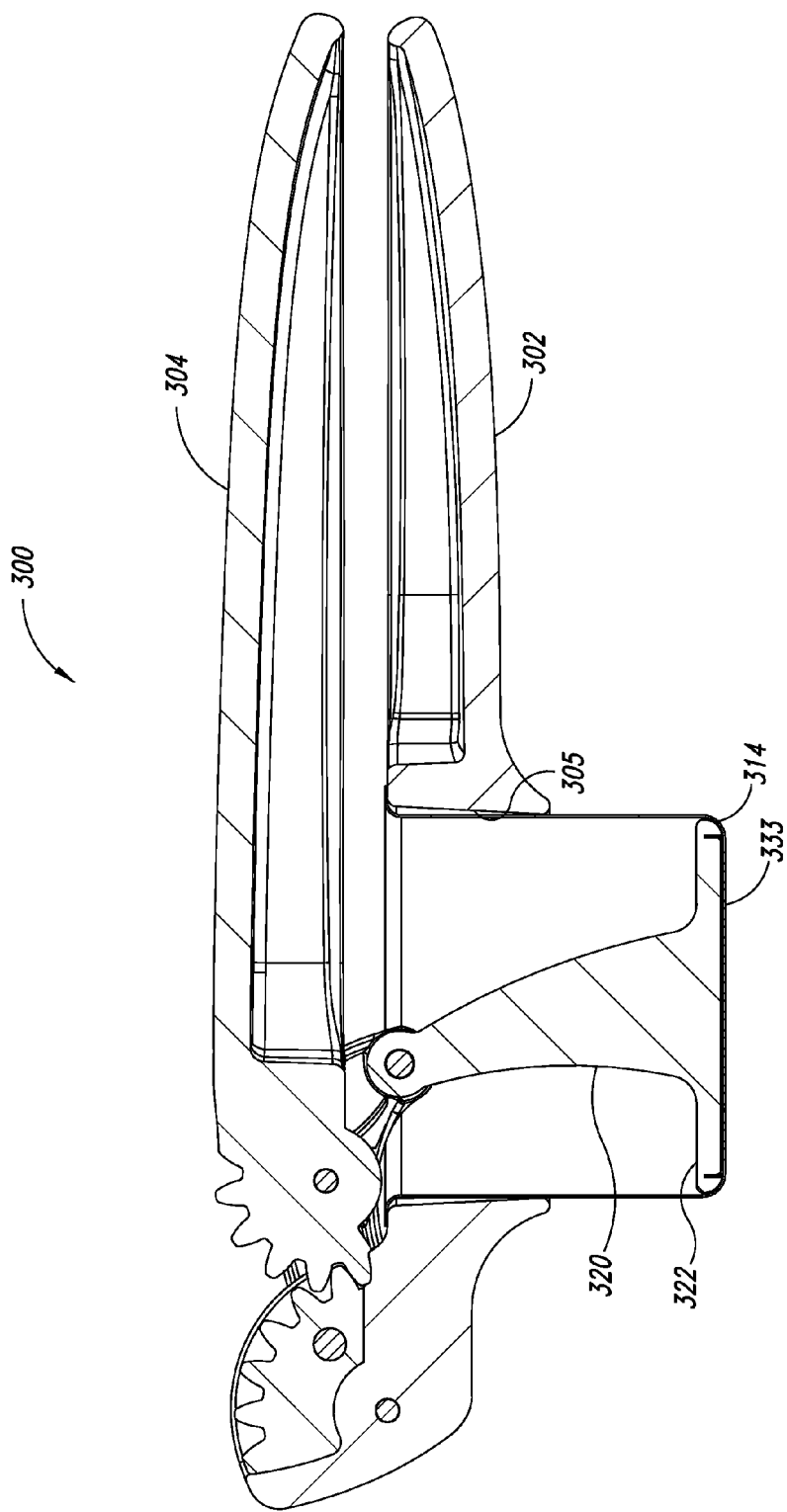
FIG. 14A is a cross-sectional view of the compression tool taken along a line 14A-14A of FIG. 13. The compression tool is in a compression configuration.
Figure 14C:
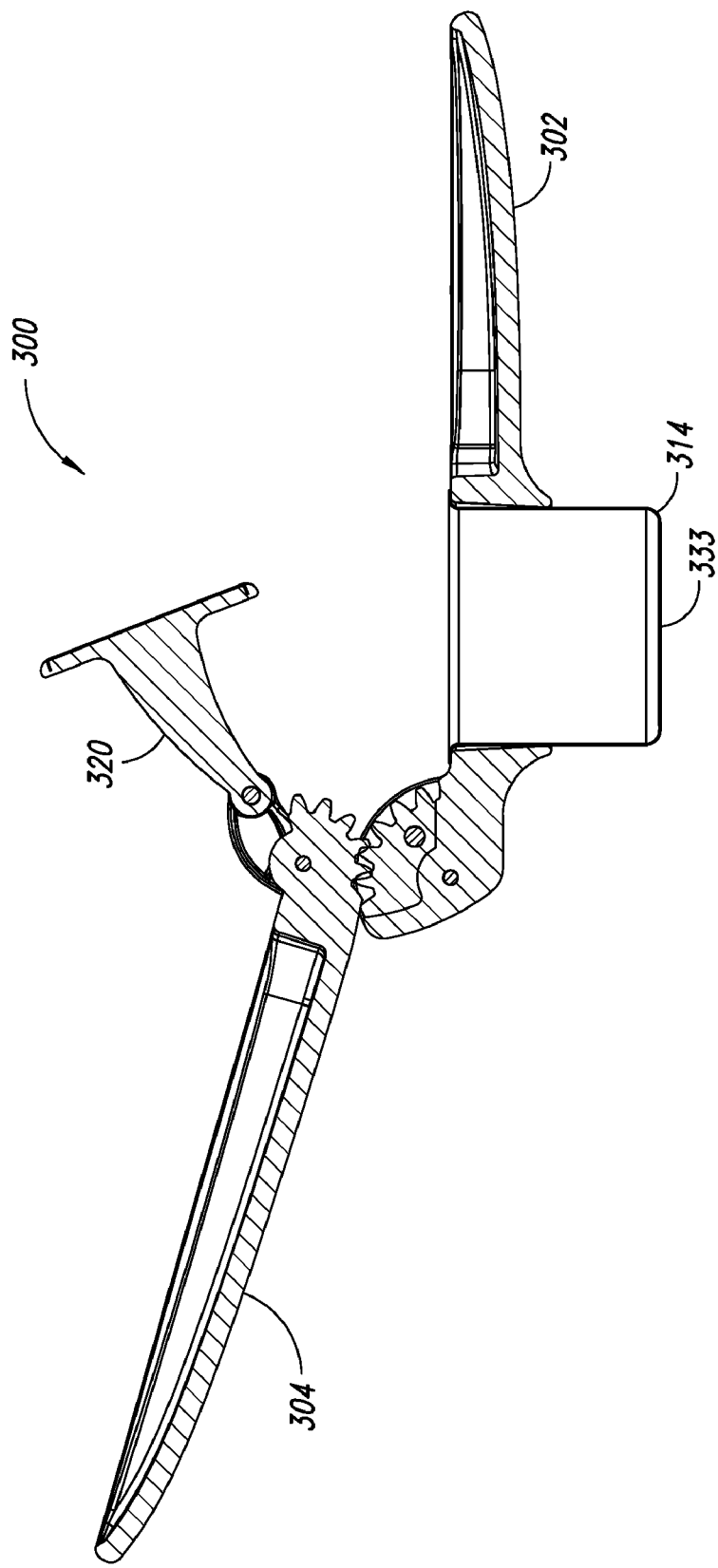
FIG. 14C is a cross-sectional view of the compression tool taken along a line 14C-14C of FIG. 13. The compression tool is in an access configuration.
Figure 15:
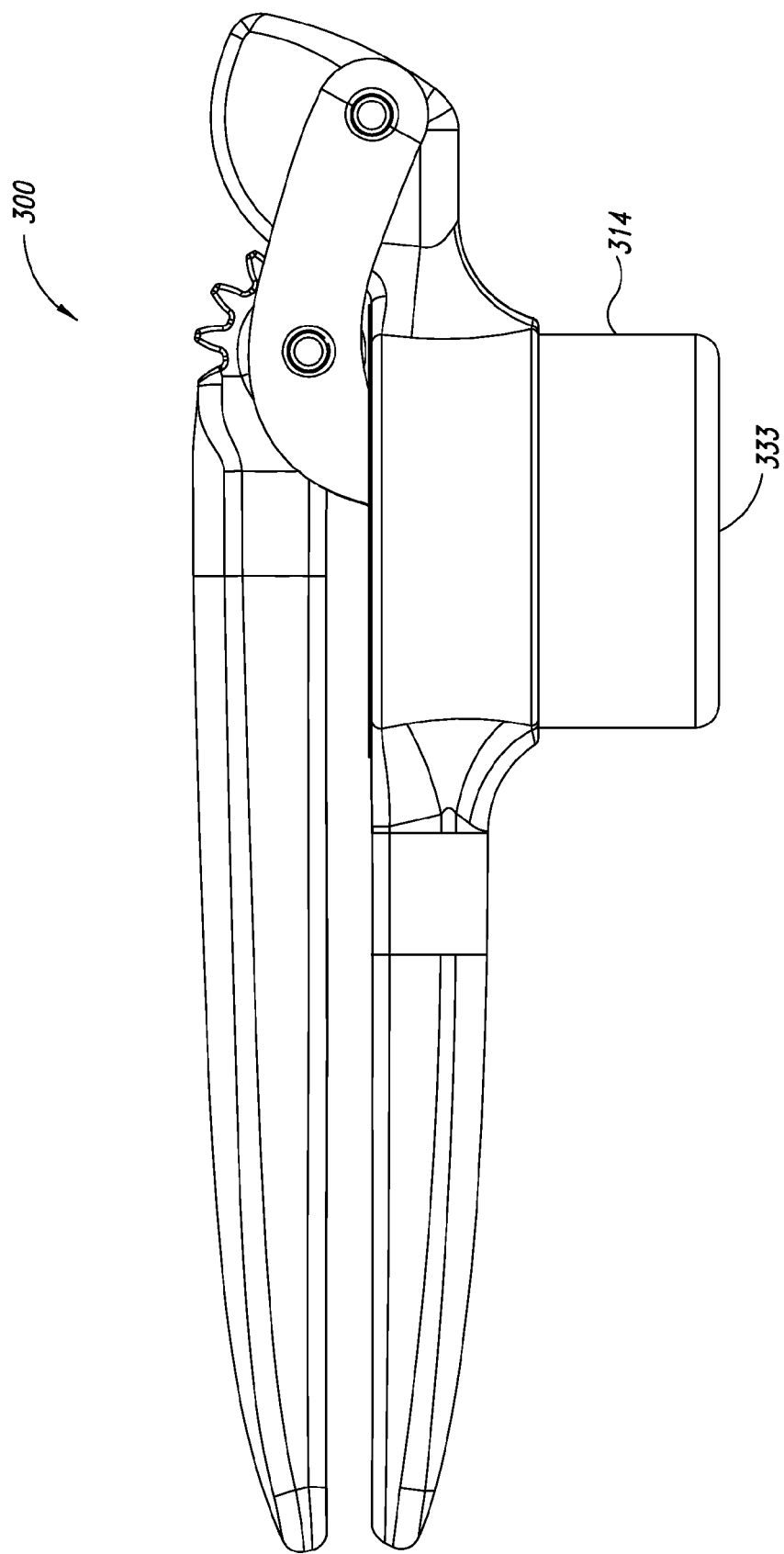
FIG. 15 is a side elevational view of the compression tool of FIG. 13.
Figure 16:
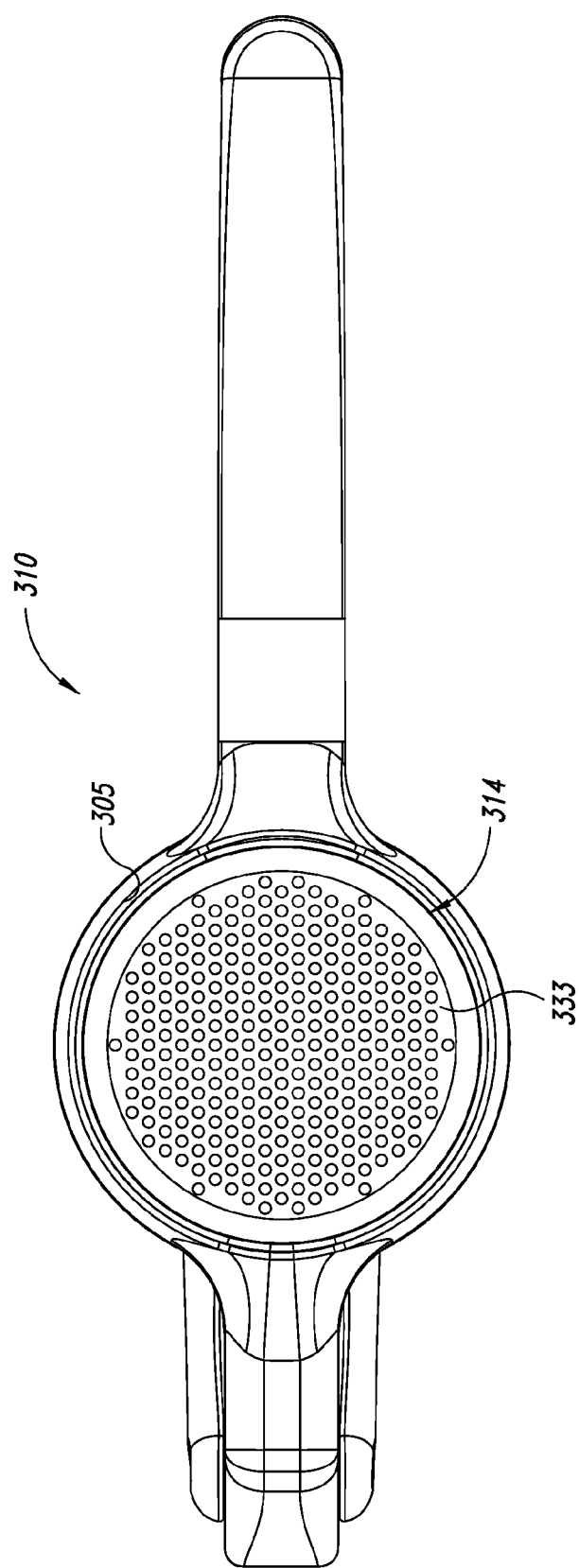
FIG. 16 is a bottom view of the compression tool of FIG. 13.

When a lever 304 is rotated from an access position of FIG. 14C to the compression position of FIG. 14A, a piston head 320 can push potato, or pieces of a potato, through relatively small through-holes in a bottom 333 (see FIG. 16) of the receptacle 314. In this manner, potato can be extruded. To make mashed potatoes, the through-holes can be relatively small. One of ordinary skill in the art can modify the compression tool 300, in view of the present disclosure, to process other types of articles. To make pasta, pasta dough can be extruded. The shape of the through holes can be selected to make different types of pasta.

Referring to FIG. 14A, a base 302 has a receiving hole 305 through which the receptacle 314 extends. FIGS. 14A-16 show the receptacle 314 extending through and downwardly away from the receiving hole 305. In some embodiments, about half of the height of the receptacle 314 is positioned outside of the base 302. Of course, different receptacles with different heights can be installed in the receiving hole 305, if needed or desired.

Figure 17:
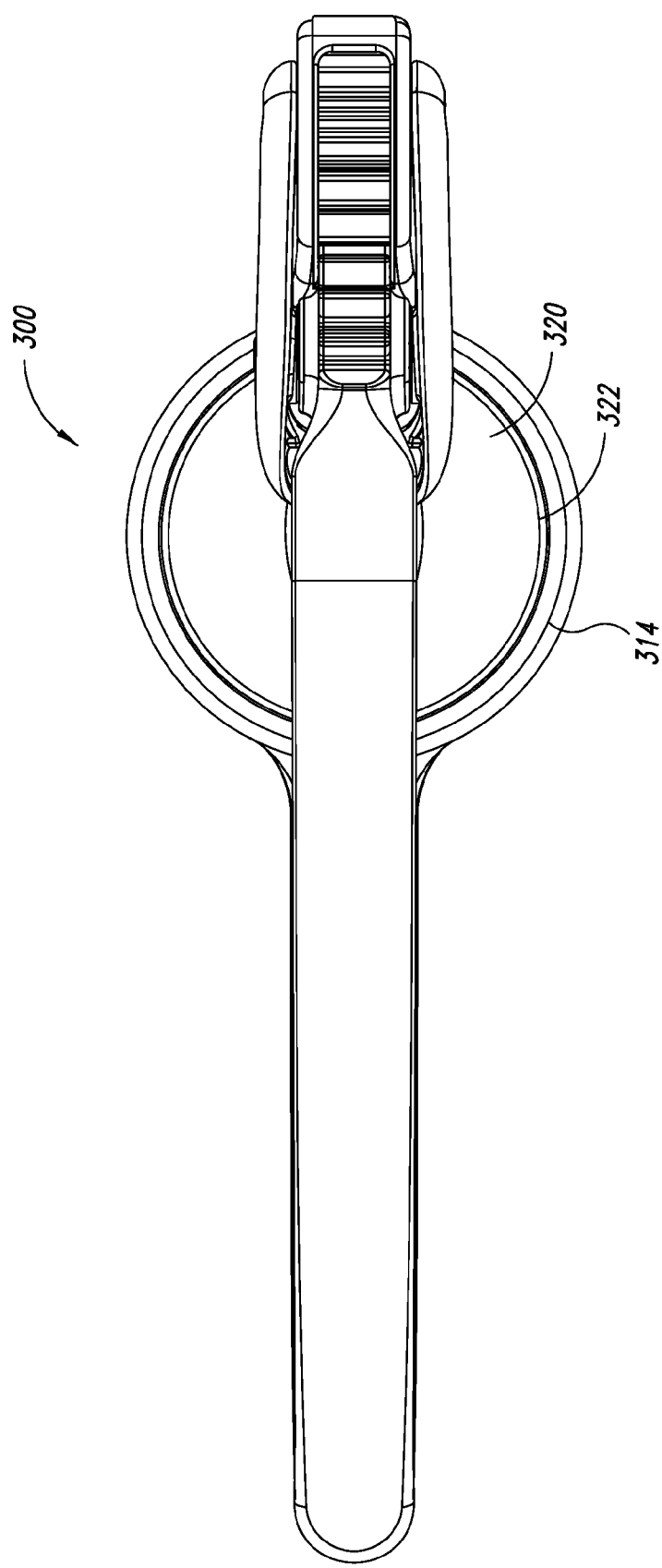
FIG. 17 is a top plan view of the compression tool of FIG. 13.

Referring to FIG. 17, a piston head 320 has a press plate 322 that has a generally circular shape. The receptacle 314 has a complementary circular shape to provide a relatively close fit with the piston head 320. Other types of piston head and receptacles can also be used.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A device for compressing articles, the device comprising:

a base having a proximal portion, a distal portion, a receptacle located between the proximal and distal portions, and a plurality of gear teeth located between the distal portion and the receptacle, the receptacle being adapted to receive an article to be compressed;

a lever having a proximal portion and a distal portion, the proximal portion of the lever being adapted to facilitate manual manipulation thereof for actuating the device, and the distal portion of the lever having a plurality of gear teeth enmeshed with the gear teeth on the base such that pivoting motion of the lever causes movement of the distal portion of the lever about the distal portion of the base; and a piston assembly coupled to the base and the lever, the piston assembly including a piston head positioned between the lever and the receptacle such that movement of the distal portion of the lever causes movement of the piston head into and out of the receptacle to compress the article in the receptacle, wherein the distal portion of the lever is linked to the distal portion of the base by a rigid linkage, the rigid linkage being pivotally coupled to the lever and the base.

2. The device of claim 1 wherein the proximal portion of the base is adapted to facilitate manual manipulation thereof for actuating the device.

3. The device of claim 1 wherein the receptacle comprises a bottom and a plurality of apertures in the bottom, the receptacle is adapted for receiving at least one clove of garlic, and wherein the piston head is adapted for pressing the clove of garlic against the bottom and through the apertures.

4. The device of claim 1 wherein the receptacle comprises a bottom and a plurality of apertures in the bottom, the receptacle is adapted for receiving at least one portion of a potato, and wherein the piston head is adapted for pressing the potato against the bottom and through the apertures.

5. The device of claim 1 wherein the receptacle comprises a dome and a plurality of drain apertures in the dome, and wherein the piston head comprises a cup adapted for pressing a half of a citrus fruit against the dome to squeeze juice from the citrus fruit.

6. The device of claim 1 wherein the plurality of gear teeth in the distal portion of the base form a portion of a partially circular gear.

7. A device for compressing articles, the device comprising:

a base having a proximal portion, a distal portion, a receptacle located between the proximal and distal portions, and a plurality of gear teeth located between the distal portion and the receptacle, the receptacle being adapted to receive an article to be compressed;

a lever having a proximal portion and a distal portion, the proximal portion of the lever being adapted to facilitate manual manipulation thereof for actuating the device, and the distal portion of the lever having a plurality of gear teeth enmeshed with the gear teeth on the base such that pivoting motion of the lever causes movement of the distal portion of the lever about the distal portion of the base; and a piston assembly coupled to the base and the lever, the piston assembly including a piston head positioned between the lever and the receptacle such that movement of the distal portion of the lever causes movement of the piston head into and out of the receptacle to compress the article in the receptacle, wherein the plurality of gear teeth in the distal portion of the base form a portion of a partially circular gear and the plurality of gear teeth in the distal portion of the lever form a portion of a complementary portion of a partially circular gear.

8. The device of claim 1 wherein the distal portion of the lever is linked to the distal portion of the base, the distal portion of the lever rolls along the distal portion of the base as the lever pivots.

9. The device of claim 1 wherein the distal portion of the lever is linked to the distal portion of the base by at least one linkage, the linkage being pivotally coupled to pins at both ends to the lever and the base, wherein the plurality of gear teeth on the distal portion of the base form a portion of a gear that is radially symmetrical about the pin in the distal portion of the base, and wherein the plurality of gear teeth on the distal portion of the lever form a portion of a gear that is radially symmetrical about the pin in the distal portion of the lever.

10. A compression tool, comprising:

a base including a base handle portion and a base hinge end, the base hinge end having a plurality of gear teeth;

a receptacle configured to receive and hold an article of food;

a lever rotatably coupled to the base, the lever including a lever handle portion and a lever hinge end having a plurality of gear teeth;

a piston assembly including a bracket assembly and a piston head carried by the bracket assembly, the bracket assembly being pivotally coupled to the base hinge end and pivotally coupled to the lever hinge end such that the plurality of gear teeth of the lever engage the plurality of gear teeth of the base, the piston head compresses the article of food held in the receptacle when the lever handle portion is moved towards the base handle portion to cause the plurality of gear teeth of the lever to move along the gear teeth of the base;

a base pin extending through the base hinge end and a linkage of the bracket assembly; and a lever pin extending through the lever hinge end and the linkage of the bracket assembly, the base pin being spaced apart from the lever pin such that the plurality of gear teeth of the lever and the plurality of gear teeth of the base are enmeshed.

11. The compression tool of claim 10, further comprising:

a piston head pin pivotally coupling the piston head to the linkage of the bracket assembly, the lever pin is located between the base pin and the piston head pin with respect to a length of the base when the compression tool is closed.

12. The compression tool of claim 10 wherein the bracket assembly includes a first linkage and a second linkage, the plurality of gear teeth of the lever and the plurality of gear teeth of the base are between the first linkage and the second linkage, the first linkage and the second linkage each have a distal end pivotally coupled to the hinge end of the base, a central region pivotally coupled to the hinge end of the lever, and a proximal end carrying the piston head.

13. The compression tool of claim 10 wherein the receptacle is a garlic clove receptacle, a potato receptacle, or a juicer receptacle.

14. A compression tool, comprising:

a lever including a plurality of gear teeth;

a base including a plurality of gear teeth;

a receptacle carried by the base;

a piston assembly including a piston head movable through at least a portion of the receptacle as the lever is moved between a first position and a second position, wherein the lever, the base, and the piston assembly cooperate to define a hinge axis of rotation about which a bracket of the piston assembly rotates and a lever axis of rotation about which the lever rotates with respect to the bracket, and the piston head is movable towards a bottom of the receptacle as the bracket rotates about the hinge axis of rotation and the lever rotates about the lever axis of rotation; and a gear reducer coupled to the lever and the base such that the bracket carrying the piston head is moved at a slower angular speed than an angular speed of the lever when the lever is rotated.

15. The compression tool of claim 14 wherein the piston assembly includes a bracket that holds the plurality of gear teeth of the lever in engagement with the plurality of gear teeth of the base as the lever pivots with respect to the base.

16. The compression tool of claim 14 wherein the plurality of gear teeth of the lever are integrally formed with an end of the lever.

17. The compression tool of claim 14 wherein an angle of rotation of the bracket about the hinge axis of rotation is less than a corresponding angle of rotation of the lever about the lever axis of rotation as the lever is moved with respect to the base.

* * * * *